(12) United States Patent
Balevi et al.

(10) Patent No.: US 12,432,675 B2
(45) Date of Patent: Sep. 30, 2025

(54) SIGNAL SYNCHRONIZATION FOR OVER-THE-AIR AGGREGATION IN A FEDERATED LEARNING FRAMEWORK

(71) Applicant: QUALCOMM Incorporated, San Diego, CA (US)

(72) Inventors: Eren Balevi, San Diego, CA (US); Taesang Yoo, San Diego, CA (US); Xiaoxia Zhang, San Diego, CA (US); Zhifei Fan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 17/696,720

(22) Filed: Mar. 16, 2022

(65) Prior Publication Data
US 2023/0319750 A1 Oct. 5, 2023

(51) Int. Cl.
*H04W 56/00* (2009.01)
*H04B 17/391* (2015.01)
*H04L 41/16* (2022.01)
*H04W 24/02* (2009.01)
*H04W 72/21* (2023.01)

(52) U.S. Cl.
CPC ...... *H04W 56/0035* (2013.01); *H04B 17/391* (2015.01); *H04L 41/16* (2013.01); *H04W 24/02* (2013.01); *H04W 72/21* (2023.01)

(58) Field of Classification Search
CPC . H04W 56/0035; H04W 72/21; H04W 24/02; H04B 17/391; H04L 41/16
See application file for complete search history.

(56) References Cited

U.S. PATENT DOCUMENTS

| | | | |
|---|---|---|---|
| 11,423,254 B2 * | 8/2022 | Prakash | G06F 9/505 |
| 2018/0324713 A1 * | 11/2018 | Yoo | H04W 72/0473 |
| 2023/0199659 A1 * | 6/2023 | Zhou | H04L 5/0078 |
| | | | 370/318 |
| 2023/0262489 A1 * | 8/2023 | Nair | G16Y 30/00 |
| | | | 370/252 |
| 2023/0319750 A1 * | 10/2023 | Balevi | H04W 72/21 |
| | | | 370/329 |
| 2024/0223407 A1 * | 7/2024 | Kim | G06N 3/04 |

* cited by examiner

*Primary Examiner* — Raj Jain
(74) *Attorney, Agent, or Firm* — Polsinelli LLP

(57) ABSTRACT

Disclosed are systems and techniques for wireless communications. For instance, a user equipment (UE) can perform federated learning to generate a first set of updated model parameters corresponding to a machine learning model. In some cases, the UE can receive a request for the first set of updated model parameters from a network entity, wherein the request includes a resource allocation associated with an uplink channel. In some examples, the UE can determine a signal phase corresponding to the uplink channel. In some aspects, the UE can transmit, based on the signal phase, the first set of updated model parameters using the resource allocation on the uplink channel.

18 Claims, 16 Drawing Sheets

SIGNAL SYNCHRONIZATION FOR OVER-THE-AIR AGGREGATION IN A FEDERATED LEARNING FRAMEWORK

FIELD OF THE DISCLOSURE

The present disclosure generally relates to wireless communications. For example, aspects of the present disclosure relate to systems and techniques for performing signal synchronization for over-the-air (OTA) aggregation in a federated learning framework.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a method for performing wireless communications is provided. The method includes: performing federated learning to generate a first set of updated model parameters corresponding to a machine learning model; receiving a request for the first set of updated model parameters from a network entity, wherein the request includes a resource allocation associated with an uplink channel; determining a signal phase corresponding to the uplink channel; and transmitting, based on the signal phase, the first set of updated model parameters using the resource allocation on the uplink channel.

In another example, an apparatus for wireless communication is provided that includes at least one memory comprising instructions and at least one processor (e.g., implemented in circuitry) configured to execute the instructions and cause the apparatus to: perform federated learning to generate a first set of updated model parameters corresponding to a machine learning model; receive a request for the first set of updated model parameters from a network entity, wherein the request includes a resource allocation associated with an uplink channel; determine a signal phase corresponding to the uplink channel; and transmit, based on the signal phase, the first set of updated model parameters using the resource allocation on the uplink channel.

In another example, a non-transitory computer-readable medium is provided for performing wireless communications, which has stored thereon instructions that, when executed by one or more processors, cause the one or more processors to: perform federated learning to generate a first set of updated model parameters corresponding to a machine learning model; receive a request for the first set of updated model parameters from a network entity, wherein the request includes a resource allocation associated with an uplink channel; determine a signal phase corresponding to the uplink channel; and transmit, based on the signal phase, the first set of updated model parameters using the resource allocation on the uplink channel.

In another example, an apparatus for wireless communications is provided. The apparatus includes: means for performing federated learning to generate a first set of updated model parameters corresponding to a machine learning model; means for receiving a request for the first set of updated model parameters from a network entity, wherein the request includes a resource allocation associated with an uplink channel; means for determining a signal phase corresponding to the uplink channel; and means for transmitting, based on the signal phase, the first set of updated model parameters using the resource allocation on the uplink channel.

In another example, a method for performing wireless communications is provided. The method includes: determining a signal phase continuity capability associated with a first user equipment (UE) and a second UE, wherein the first UE and the second UE are configured to perform federated learning for training a machine learning model; transmitting a first request to the first UE for a first set of updated model parameters corresponding to the machine learning model, wherein the first request includes a resource allocation associated with an uplink channel; transmitting a second request to the second UE for a second set of updated model parameters corresponding to the machine learning model, wherein the second request includes the resource allocation associated with the uplink channel; and receiving a combined set of updated model parameters using the resource allocation on the uplink channel, wherein the combined set of updated model parameters corresponds to an over-the-air (OTA) aggregation of the first set of updated model parameters and the second set of updated model parameters.

In another example, an apparatus for wireless communication is provided that includes at least one memory comprising instructions and at least one processor (e.g., implemented in circuitry) configured to execute the instructions and cause the apparatus to: determine a signal phase continuity capability associated with a first user equipment (UE) and a second UE, wherein the first UE and the second UE are configured to perform federated learning for training a machine learning model; transmit a first request to the first UE for a first set of updated model parameters corresponding to the machine learning model, wherein the first request includes a resource allocation associated with an uplink channel; transmit a second request to the second UE for a second set of updated model parameters corresponding to the machine learning model, wherein the second request includes the resource allocation associated with the uplink channel; and receive a combined set of updated model parameters using the resource allocation on the uplink channel, wherein the combined set of updated model parameters corresponds to an over-the-air (OTA) aggregation of the first set of updated model parameters and the second set of updated model parameters.

In another example, a non-transitory computer-readable medium is provided for performing wireless communications, which has stored thereon instructions that, when executed by one or more processors, cause the one or more processors to: determine a signal phase continuity capability associated with a first user equipment (UE) and a second UE, wherein the first UE and the second UE are configured to perform federated learning for training a machine learning model; transmit a first request to the first UE for a first set of updated model parameters corresponding to the machine learning model, wherein the first request includes a resource allocation associated with an uplink channel; transmit a second request to the second UE for a second set of updated model parameters corresponding to the machine learning model, wherein the second request includes the resource allocation associated with the uplink channel; and receive a combined set of updated model parameters using the resource allocation on the uplink channel, wherein the combined set of updated model parameters corresponds to an over-the-air (OTA) aggregation of the first set of updated model parameters and the second set of updated model parameters.

In another example, an apparatus for wireless communications is provided. The apparatus includes: means for determining a signal phase continuity capability associated with a first user equipment (UE) and a second UE, wherein the first UE and the second UE are configured to perform federated learning for training a machine learning model; means for transmitting a first request to the first UE for a first set of updated model parameters corresponding to the machine learning model, wherein the first request includes a resource allocation associated with an uplink channel; means for transmitting a second request to the second UE for a second set of updated model parameters corresponding to the machine learning model, wherein the second request includes the resource allocation associated with the uplink channel; and means for receiving a combined set of updated model parameters using the resource allocation on the uplink channel, wherein the combined set of updated model parameters corresponds to an over-the-air (OTA) aggregation of the first set of updated model parameters and the second set of updated model parameters.

In some aspects, the apparatus is or is part of a base station (e.g., a 3GPP gNodeB (gNB) for 5G/NR, a 3GPP eNodeB (eNB) for LTE, a central unit (CU), a distributed unit (DU), a radio unit (RU), a Near-Real Time (Near-RT) RAN Intelligent Controller (RIC), or a Non-Real Time (Non-RT) RIC, a Wi-Fi access point (AP), or other base station). In some aspects, the apparatus includes a transceiver configured to transmit and/or receive radio frequency (RF) signals. In some aspects, the processor includes a neural processing unit (NPU), a central processing unit (CPU), a graphics processing unit (GPU), or other processing device or component.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
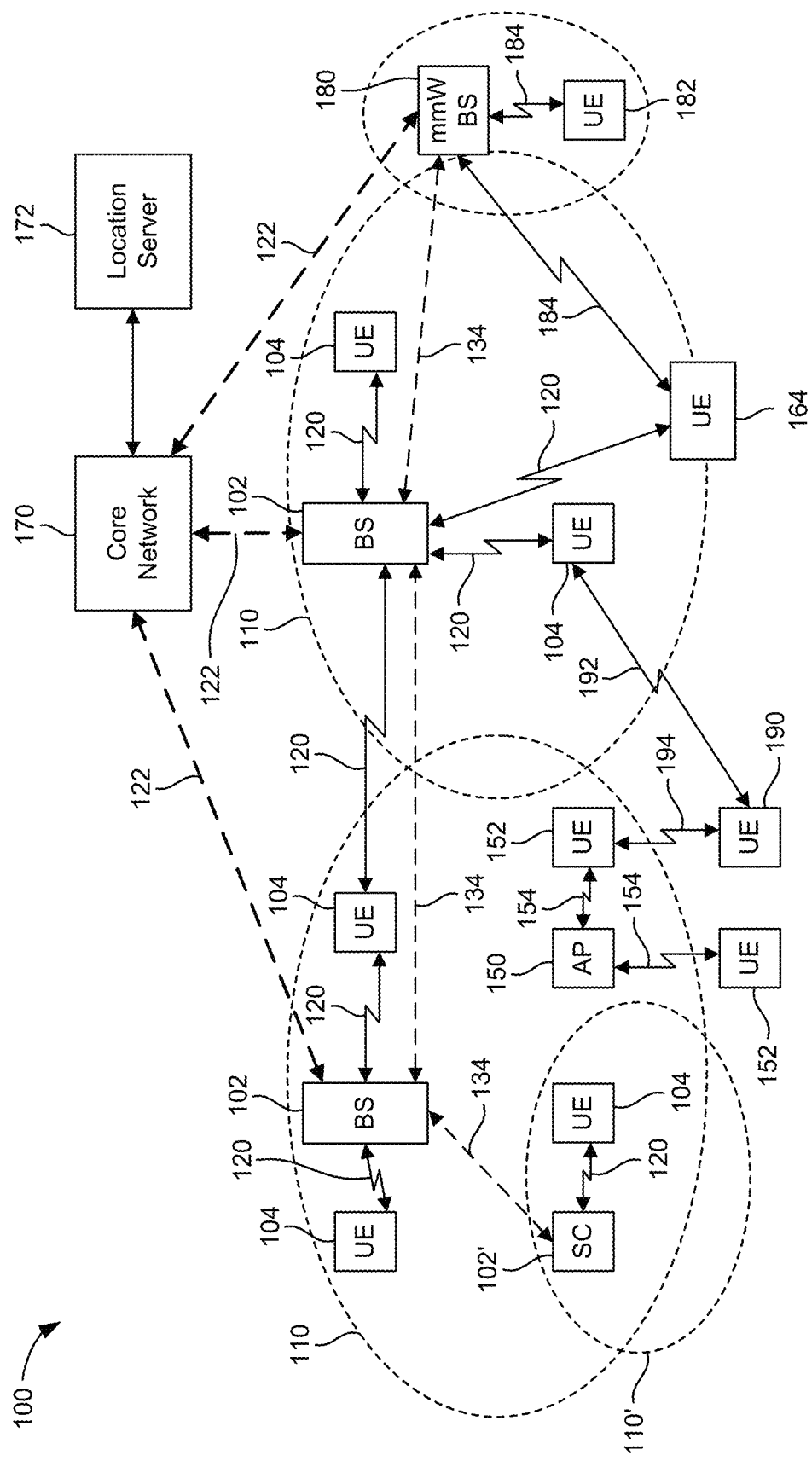
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB can be over a Uu interface. In some cases, an access link may support uplink signaling, downlink signaling, connection procedures, etc.

In some aspects, one or more entities in a wireless network may be configured to train a machine learning model. For example, centralized training may be implemented using a single computing device or apparatus (e.g., a server) that can store the machine learning model (e.g., neural network 500) and the training data. In some cases, centralized training may require a server having significant computational resources. In some examples, centralized training can take a significant amount of time to complete.

In another example, distributed training may be implemented using a centralized parameter server and multiple computing devices that can each perform a portion of the computational tasks for training the machine learning model. In some aspects, the computing devices used to implement distributed training may include data centers. In some cases, distributing the training data among the computing devices may increase computational and communication costs associated with determining batch size, distributing the training data, and/or sending parameters updates to centralized parameter server.

In some aspects, federated training may be implemented using a centralized parameter server and multiple client devices that can each perform a portion of the computational tasks for training the machine learning model. In some examples, the client devices used to implement federated training may include UEs (e.g., cell phones, IoT devices, etc.). In some cases, client devices may perform federated training using private data stored on the client device (e.g., federated training may not use a training data set). In some examples, federated training may incur higher communication costs based on the number of client devices transmitting network parameter updates to the centralized parameter server.

In some examples, model parameter updates based on federated learning may be combined using over-the-air (OTA) aggregation. In some aspects, OTA aggregation may be implemented by configuring multiple client devices to simultaneously transmit using the same time/frequency resources. In some cases, OTA aggregation may fail if the transmissions by the multiple client devices are not properly synchronized.

Systems, apparatuses, processes (also referred to as methods), and computer-readable media (collectively referred to as "systems and techniques") are described herein for performing signal synchronization for over-the-air (OTA) aggregation in a federated learning framework. In some aspects, the systems and techniques provide the ability for two or more user equipment (UE) devices to synchronize uplink transmissions for OTA aggregation of model parameter updates.

In some aspects, UEs may synchronize uplink transmissions for OTA aggregation based on a signal phase indication received from a network entity (e.g., base station or a component of a disaggregated base station, as described herein). In some examples, the signal phase indication may be based on channel state information (CSI) associated with an uplink reference signal (e.g., transmitted by the UE to the network entity). In some cases, the signal phase for an uplink channel may be determined by a UE based on a downlink channel (e.g., based on channel reciprocity).

In some examples, UEs may further synchronize uplink transmissions for OTA aggregation by determining an inter-UE phase synchronization drift. In some aspects, a UE may adjust an uplink transmission to compensate for inter-UE phase synchronization drift. In some cases, inter-phase synchronization drift may be determined by transmitting one or more sidelink reference signals. In some aspects, the UEs may transmit and receive bidirectional sidelink reference signals.

In some cases, UEs may determine inter-UE phase synchronization drift based by transmitting an uplink synchronization reference signal to a network entity. In some aspects, the network entity may respond with a downlink synchronization reference signal that is modulated with the UL synchronization signal. In some cases, a UE may use the DL synchronization reference signal to determine the inter-UE phase synchronization drift.

In some aspects, a network entity may determine inter-UE phase synchronization drift based on uplink and/or downlink communications with the UEs. For example, a network entity may use an uplink reference signal (e.g., sounding reference signal) to determine an UL co-phasing parameter. In some aspects, a network entity may use channel state feedback (CSF) corresponding to a downlink reference signal (e.g., channel state information reference signal (CSI-RS)) to determine a DL co-phasing parameter. In some cases, the UL co-phasing parameter and/or the DL co-phasing parameter can be provided to a UE for synchronization of uplink transmissions. In some cases, a network entity may determine an optimized phase shift parameter based on the UL co-phasing parameter and the DL co-phasing parameter.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier Polsinelli Ref. No. 094922-707295 operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
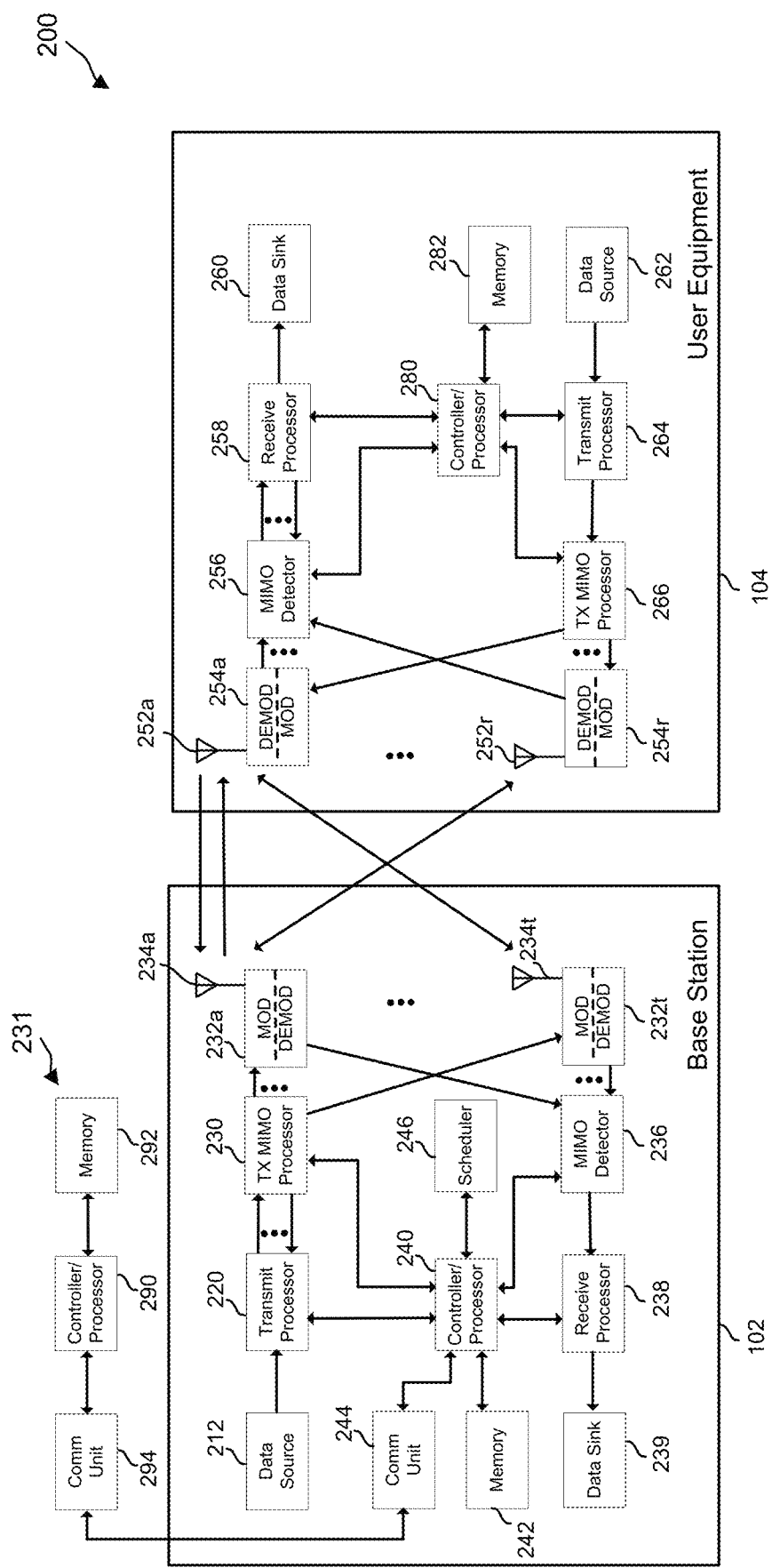
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
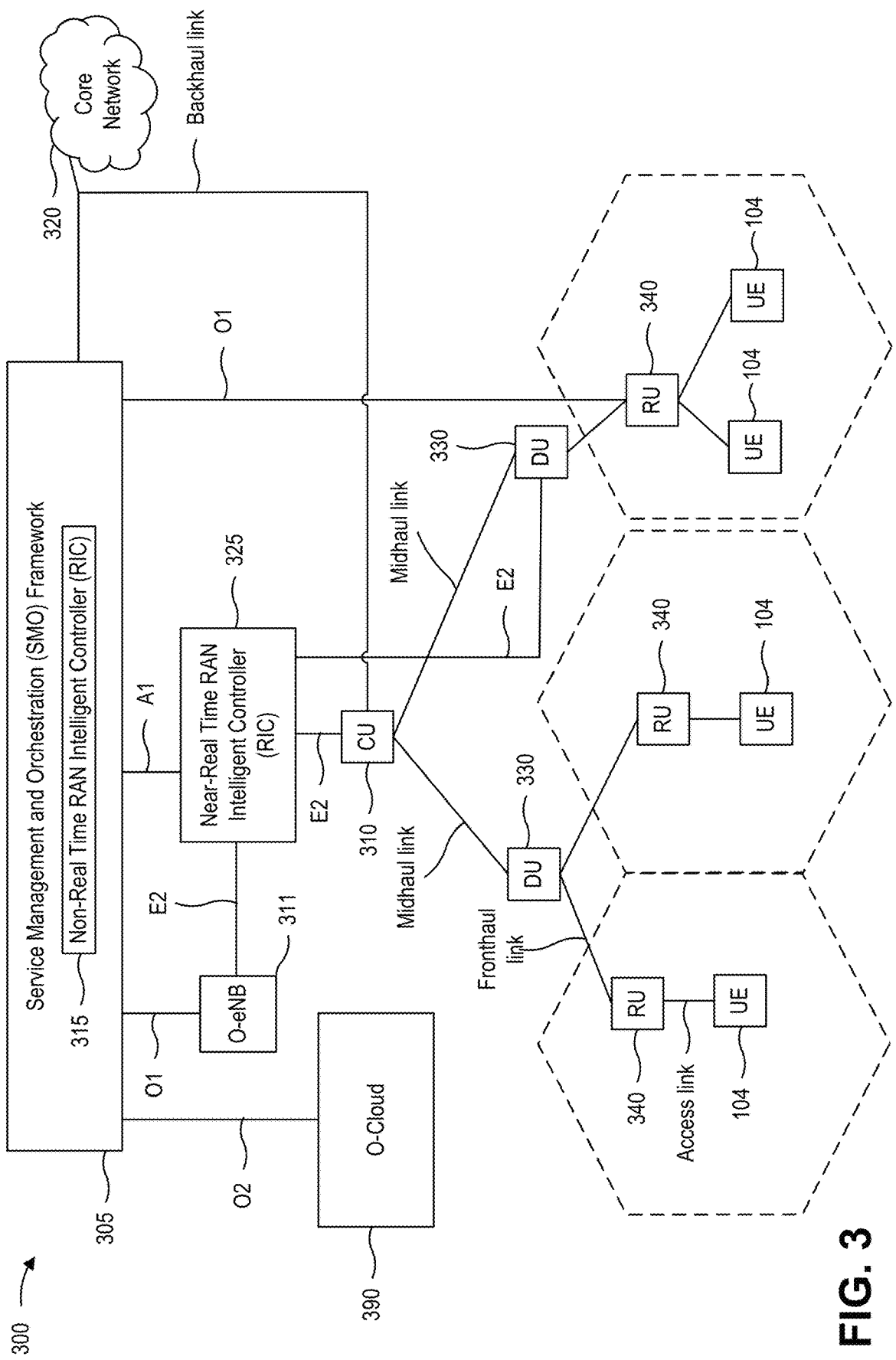
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
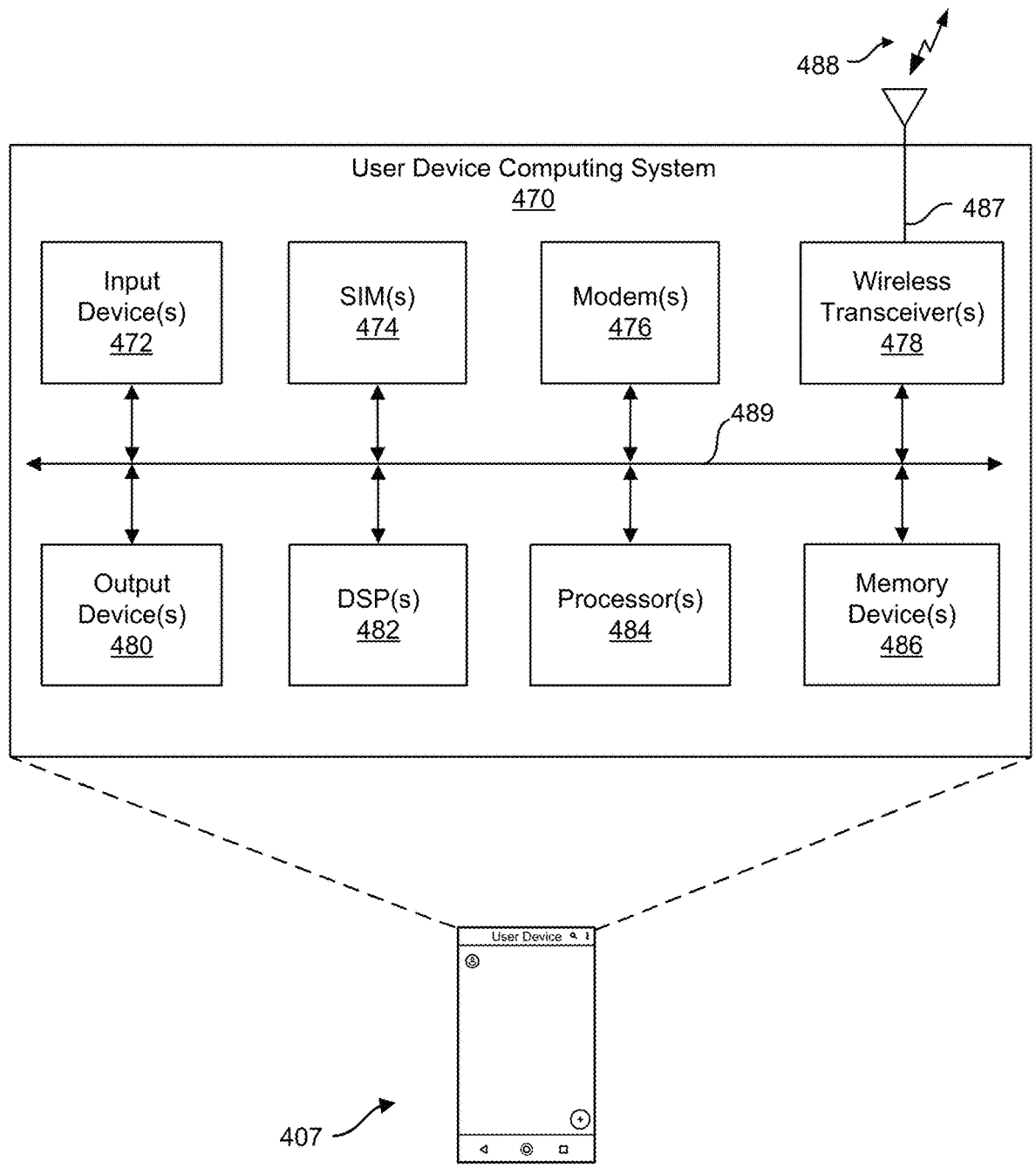
FIG. 4 is a block diagram illustrating components of a user equipment, in accordance with some examples.

FIG. 4 illustrates an example of a computing system 470 of a wireless device 407. The wireless device 407 can include a client device such as a UE (e.g., UE 104, UE 152, UE 190) or other type of device (e.g., a station (STA) configured to communication using a Wi-Fi interface) that can be used by an end-user. For example, the wireless device 407 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICs, FPGAs, APs, GPUs, VPUs, NSPs, microcontrollers, dedicated hardware, any combination thereof, and/or other processing device or system. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 can include one or more radio frequency (RF) interfaces configured to transmit and/or receive RF signals. In some examples, an RF interface can include components such as modem(s) 476, wireless transceiver(s) 478, and/or antennas 487. The one or more wireless transceivers 478 can transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that radio frequency (RF) signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 can be configured to transmit RF signals for performing sidelink communications via antenna 487 in accordance with one or more transmit power parameters that can be associated with one or more regulation modes. Wireless transceivers 478 can also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the AES and/or DES standard) transmitted and/or received by the one or more wireless transceivers 478.

The one or more SIMs 474 can each securely store an international mobile subscriber identity (IMSI) number and related key assigned to the user of the wireless device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a Wi-Fi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 5:
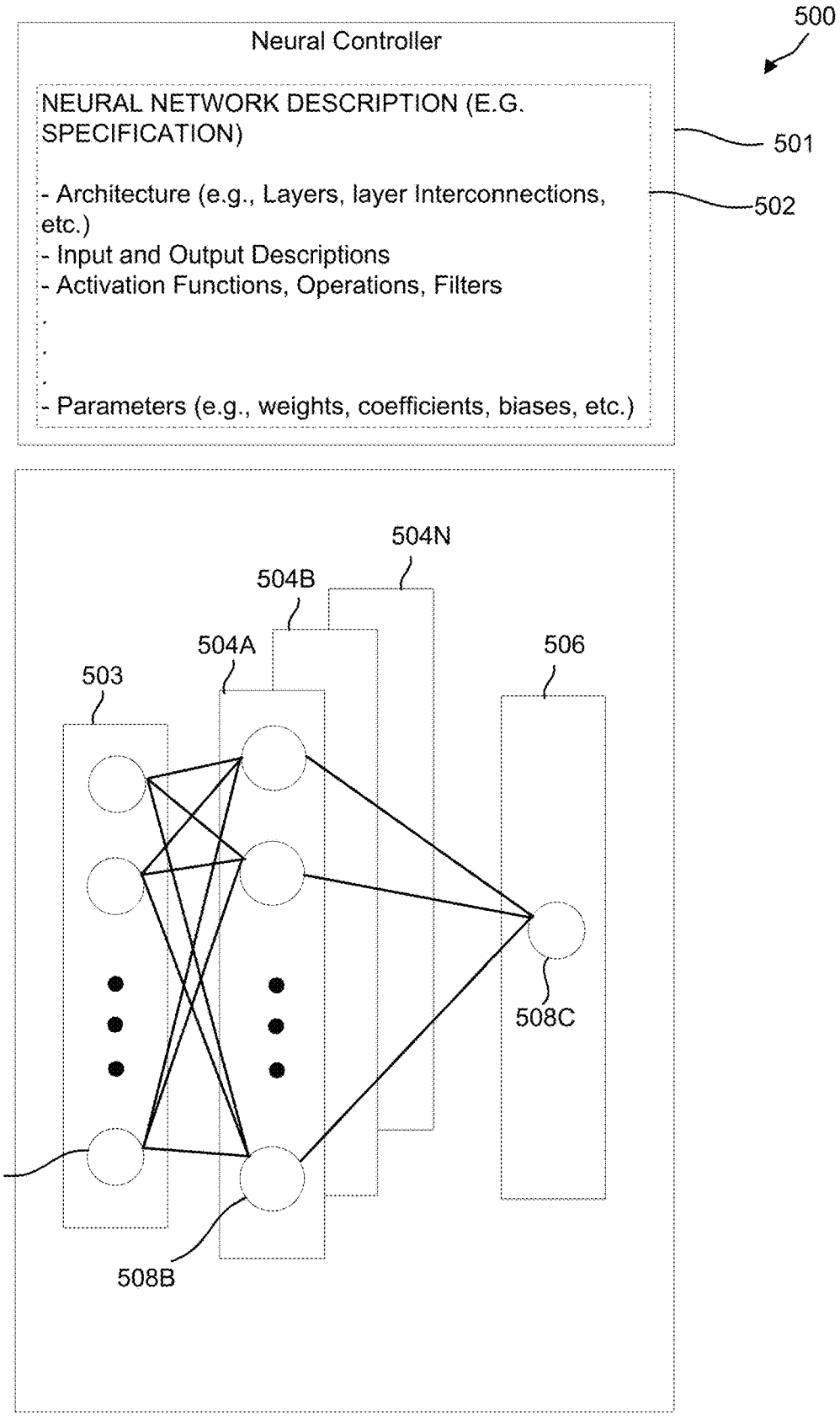
FIG. 5 is a diagram illustrating an example machine learning model, in accordance with some examples.

FIG. 5 illustrates an example neural architecture of a neural network 500 that can be trained using federated learning, in accordance with some aspects of the present disclosure. The example neural architecture of the neural network 500 may be defined by an example neural network description 502 in neural controller 501. The neural network 500 is an example of a machine learning model that can be deployed and implemented at the base station 102, the central unit (CU) 310, the distributed unit (DU) 330, the radio unit (RU) 340, and/or the UE 104. The neural network 500 can be a feedforward neural network or any other known or to-be-developed neural network or machine learning model.

The neural network description 502 can include a full specification of the neural network 500, including the neural architecture shown in FIG. 5. For example, the neural network description 502 can include a description or specification of architecture of the neural network 500 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 500 can reflect the neural architecture defined in the neural network description 502. The neural network 500 can include any suitable neural or deep learning type of network. In some cases, the neural network 500 can include a feedforward neural network. In other cases, the neural network 500 can include a recurrent neural network, which can have loops that allow information to be carried across nodes while reading in input. The neural network 500 can include any other suitable neural network or machine learning model. One example includes a convolutional neural network (CNN), which includes an input layer and an output layer, with multiple hidden layers between the input and out layers. The hidden layers of a CNN include a series of hidden layers as described below, such as convolutional, nonlinear, pooling (for downsampling), and fully connected layers. In other examples, the neural network 500 can represent any other neural or deep learning network, such as an autoencoder, a deep belief nets (DBNs), a recurrent neural network (RNN), etc.

In the non-limiting example of FIG. 5, the neural network 500 includes an input layer 503, which can receive one or more sets of input data. The input data can be any type of data (e.g., image data, video data, network parameter data, user data, etc.). The neural network 500 can include hidden layers 504A through 504N (collectively "504" hereinafter). The hidden layers 504 can include n number of hidden layers, where n is an integer greater than or equal to one. The n number of hidden layers can include as many layers as needed for a desired processing outcome and/or rendering intent. In one illustrative example, any one of the hidden layers 504 can include data representing one or more of the data provided at the input layer 503. The neural network 500 further includes an output layer 506 that provides an output resulting from the processing performed by hidden layers 504. The output layer 506 can provide output data based on the input data.

In the example of FIG. 5, the neural network 500 is a multi-layer neural network of interconnected nodes. Each node can represent a piece of information. Information associated with the nodes is shared among the different layers and each layer retains information as information is processed. Information can be exchanged between the nodes through node-to-node interconnections between the various layers. The nodes of the input layer 503 can activate a set of nodes in the first hidden layer 504A. For example, as shown, each input node of the input layer 503 is connected to each node of the first hidden layer 504A. The nodes of the hidden layer 504A can transform the information of each input node by applying activation functions to the information. The information derived from the transformation can then be passed to and can activate the nodes of the next hidden layer (e.g., 504B), which can perform their own designated functions. Example functions include convolutional, up-sampling, data transformation, pooling, and/or any other suitable functions. The output of hidden layer (e.g., 504B) can then activate nodes of the next hidden layer (e.g., 504N), and so on. The output of last hidden layer can activate one or more nodes of the output layer 506, at which point an output can be provided. In some cases, while nodes (e.g., nodes 508A, 508B, 508C) in the neural network 500 are shown as having multiple output lines, a node can have a single output and all lines shown as being output from a node can represent the same output value.

In some cases, each node or interconnection between nodes can have a weight that is a set of parameters derived from training the neural network 500. For example, an interconnection between nodes can represent a piece of information learned about the interconnected nodes. The interconnection can have a numeric weight that can be tuned (e.g., based on a training dataset), allowing the neural network 500 to be adaptive to inputs and able to learn as more data is processed.

The neural network 500 can be pre-trained to process the features from the data in the input layer 503 using different hidden layers 504 in order to provide the output through the output layer 506. For example, in some cases, the neural network 500 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training data until the weights of the layers are accurately tuned (e.g., meet a configurable threshold determined based on experiments and/or empirical studies).

In some examples, neural network 500 can be trained using centralized learning techniques. In some aspects, centralized learning can be implemented using a single computing device or apparatus (e.g., a server) that can store the machine learning model (e.g., neural network 500) and the training data. In some cases, centralized training can be performed by minimizing a loss function. In some instances, the optimization problem can be represented using the Equation (1) below, in which f can represent the machine learning model (e.g., neural network 500); $\theta \in R^d$ can represent the training parameters; n can represent the number of training samples or the number of (x: input, y: output) pairs; and where output y can be regarded as the labels for the corresponding x, as follows:

$$\min_{\theta} f(\theta) = \frac{1}{n} \sum_{i=1}^{n} f_{i(\theta)} \quad (1)$$

In some cases, $f_i(\theta)$ can correspond to the loss function evaluated at training sample i and may be represented as follows: $f_i(\theta)=l(x_i, y_i, \theta)$. In some aspects, mean squared error (MSE) loss may be represented as follows: $f_i(\theta)=\|y_i - f(x_i, \theta)\|_2^2$.

In some aspects, the loss function can be minimized or solved using mini-batch stochastic gradient-descent (SGD). In some cases, SGD can be implemented by performing the following operation for each training round t, in which $\mu_t$ is the step size or learning rate:

$$\theta_{t+1}^{(c)} \leftarrow \theta_t^{(c)} - \mu_t \nabla f \quad (2)$$

In some cases, neural network 500 can be trained using distributed training techniques. In some aspects, distributed training can be implemented using multiple computing devices (e.g., worker nodes) that can each perform a portion of the computational tasks for training the machine learning model. In some examples, each worker node can train the same machine learning model (e.g., neural network 500) using an assigned local training dataset. In some cases, the machine learning model can be optimized by combining the machine learning parameters from each of the worker nodes.

In one illustrative example, distributed training can be performed by dividing n training samples among K worker nodes, as follows:

$$F_1(\theta), n_1[\text{worker 1}] \ldots F_K(\theta), n_K[\text{worker } K]; (n_1 + \ldots + n_K = n) \quad (3)$$

In some aspects, the machine learning model can be optimized by combining updates from worker nodes using distributed SGD algorithm such as distributed synchronous SGD or any other asynchronous SGD algorithms. In some cases, the machine learning model can be optimized according to the following equation:

$$\min_\theta f(\theta) = \sum_{k=1}^{K} \frac{n_k}{n} F_k(\theta); F_k(\theta) = \frac{1}{n_k} \sum_{i \in P_k} f_i(\theta) \quad (4)$$

In some examples, each worker node k can calculate or determine machine learning parameters by using the gradient of a loss function, as follows:

$$\theta_{t+1,k}^{(d)} \leftarrow \theta_{t,k}^{(d)} - \mu_t \nabla F_k \quad (5)$$

In some cases, each worker node can provide the updated machine learning parameters to a centralized parameter server that can aggregate the updated parameters from k worker nodes, as follows:

$$\theta_{t+1}^{(a)} \leftarrow \sum_{k=1}^{K} \frac{n_k}{n} \theta_{t+1,k}^{(a)} \quad (6)$$

In some aspects, the above-steps can be repeated for t number of communications rounds. For example, each worker node may provide t updates to the centralized parameter server for aggregation. In some examples, the t number of communications rounds corresponds to a number of rounds to achieve convergence of the machine learning model.

In some examples, the training data used to implement distributed training is independent and identically distributed (IID) (e.g., each data set provided to worker nodes has same probability distribution as the others and all are mutually independent). In some cases, IID data can yield the following relations:

$$E_{P_k}[F_k(\theta)] = f(\theta); \lim_{t \to \infty} \theta_t^{(c)} = \lim_{t \to \infty} \theta_t^{(c)} = \lim_{t \to \infty} \theta_t^{(d)} \quad (7)$$

In some cases, neural network 500 can be trained using federated training techniques. In some examples, federated training can correspond to a type of distributed learning that can be implemented using multiple client devices (e.g., worker nodes). In some instances, the client devices can each perform a portion of the computational tasks for training the machine learning model. In some examples, the client devices can include user equipment devices (e.g., mobile devices, IoT devices, etc.). In some cases, federated training can be used to preserve data privacy. For example, client devices implementing federated training can use private data (e.g., locally stored data) to train the machine learning model. In some aspects, the training data is not IID among client devices.

In some examples, client devices that perform federated training may have a lower computational capacity and/or less reliable network connectivity (e.g., for providing updates to a parameter server) than worker nodes used in distributed learning. In some cases, client devices can be configured to provide updated parameters to a parameter server after an aggregation period (e.g., local epoch 'E'). In some examples, the aggregation period or local epoch can correspond to a number of machine learning training cycles performed by a client device prior to a communication round with the parameter server (e.g., client device update to parameters server includes parameter update corresponding to E number of training cycles). In some cases, the parameter server can optimize the machine learning model by combining the machine learning parameters from each of the client devices.

In some aspects, the machine learning model can be optimized according to Equation (4) above. In some examples, each client device k can calculate or determine machine learning parameters by performing the following operation for each local epoch e=1, . . . , E, as follows:

$$\theta_{(t-1)E+e+1,k}^{(f)} \leftarrow \theta_{(t-1)E+e,k}^{(f)} - \mu_t \nabla F_k \quad (8)$$

In some cases, each client device can provide the updated machine learning parameters to a centralized parameter server that can aggregate the updated parameters from k client devices, as follows:

$$\theta_{tE+1}^{(f)} \leftarrow \sum_{k=1}^{K} \frac{n_k}{n} \theta_{tE+1,k}^{(f)} \quad (9)$$

In some aspects, the above-steps can be repeated for t number of communications rounds. For example, each client device may provide t updates to the centralized parameter server for aggregation. In some examples, the local epoch E may change or remain the same for different communication rounds. In some cases, the t number of communications rounds corresponds to a number of rounds to achieve convergence of the machine learning model.

In some examples, neural network 500 can be trained using hierarchical federated training techniques. In some cases, hierarchical federated training may include a hierarchical structure for aggregating updates to machine learning parameters that are calculated by client devices. For example, different sets of client devices may provide updated machine learning parameters to different nodes for aggregation. In some cases, those nodes may provide aggregated parameters (e.g., from client devices) to another node for further aggregation. In some aspects, final aggregation of all updated machine learning parameters may be performed by a node that is at the top of a hierarchical structure.

In some aspects, training of the neural network (e.g., via centralized training, distributed training, federated training, or hierarchical federated training) can result in a trained neural network having a corresponding set of neural network parameters. In some cases, the trained neural network 500 can be deployed at one or more computing devices (e.g., base station 102, the central unit (CU) 310, the distributed unit (DU) 330, the radio unit (RU) 340, and/or the UE 104).

Figure 6:
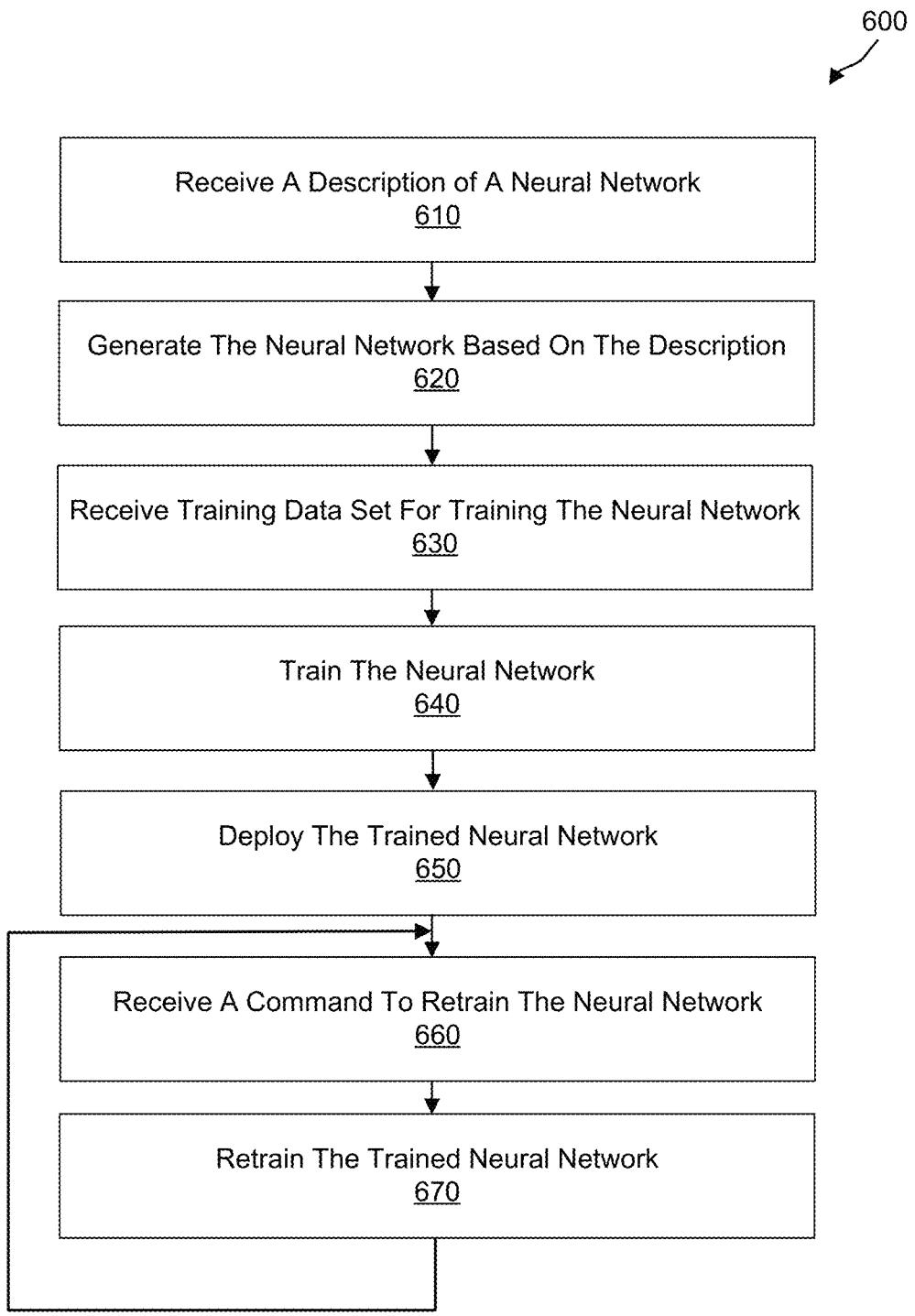
FIG. 6 is a flow chart illustrating an example of a process of training a machine learning algorithm, in accordance with some examples.

FIG. 6 is a flow chart of a process 600 of training a machine learning algorithm, such as neural network 500, in accordance with some aspects of the present disclosure. Operation of FIG. 6 will be described in relation to FIG. 5. Neural network 500 may be implemented at the base station 102, the central unit (CU) 310, the distributed unit (DU) 330, the radio unit (RU) 340, and/or the UE 104.

At operation 610, the neural controller 501 receives a description of the structure of the neural network 500 (e.g., from base station 102) including, but not limited to, the architecture of the neural network 500 and definition of layers, layer interconnections, input and output descriptions, activation functions, operations, filters, parameters such as weights, coefficients, biases, etc. In some examples, the description can be received from a device based on a user input received by the device (e.g., input via an input device, such as a keyboard, mouse, touchscreen interface, and/or other type of input device). In some examples, operation 610 is optional and may not be performed. For example, the neural network 500 can be UE specific (e.g., executed by the UE) and thus the description and specific configurations of the neural network 500 may be provided by the UE 104. At operation 620, the neural network 500 is generated based on the description received at operation 610. Using the description, the neural controller 501 generates appropriate input, intermediate, and output layers with defined interconnections between the layers and/or any weights or other parameters/coefficients assigned thereto. The weights and/or other parameters/coefficients can be set to initialized values, which will be modified during training, as described below. In some examples, operation 620 is optional and may not be performed (e.g., when the neural network 500 is UE specific).

At operation 630, once the neural network 500 is defined, a training data set is provided to the input layer 503 of the neural network 500. In some examples, there may not be an explicitly dedicated training data set for the purpose of training the neural network 500 or the training data set may not necessarily be a predetermined data set. In some examples, the real-time data can be used for live training of the neural network 500, for example, using an online-learning approach. In some aspects, the training data set may include a portion of the training data (e.g., distributed training). In some cases that implement distributed training, the training data may be independent and identically distributed (IID). In some cases, that implement federated training and/or hierarchical federated training, the training data may be private or local to the UE. In some examples, the data among UEs may not be IID.

At operation 640, the neural network 500 is trained using the training data set, a portion of the training data set, or a localized private data set on a client device (e.g., a UE). As noted above, training of the neural network can be performed using centralized learning, distributed learning, federated learning, hierarchical federated learning, and/or any other suitable learning technique. In one example, the training of the neural network 500 is an iterative process repeated multiple times. In some cases, each iteration of training can include a validation using a test data set. The test data set may include a set of one or more parameters similar to those used as part of the training dataset and associated output preference levels for one or more parameters. During each iteration, the output at the output layer 506 can be compared to the desired output or y in the training data set and a delta between the output at the output layer 506 at that iteration and the desired output defined in the training data set is determined. The weights and other parameters or coefficients of the various layers can be adjusted based on the delta. The iterative process may continue until the delta for any given set of input parameters is less than a threshold (e.g., optimizing or minimizing a loss function). The threshold may be a configurable parameter determined based on experiments and/or empirical studies.

At operation 650 and once the neural network 500 is trained, the trained neural network 500 can be deployed at the base station 102, the central unit (CU) 310, the distributed unit (DU) 330, the radio unit (RU) 340, the UE 104, and/or any other apparatus.

At operation 660, a triggering condition for retraining the neural network 500 is detected. In some cases, the command may be received after the trained neural network 500 is deployed. At operation 670, the neural network 500 is retrained using the parameters or data received as part of the command at operation 660.

Retraining the neural network 500 may include adjusting weights, coefficients, biases, and/or parameters at different nodes of the different layers of the neural network 500. The operation 660 and 670 (the retraining of the neural network 500) may be continuously repeated, thus resulting in increased accuracy of the neural network 500 over time. In some aspects, retraining of the neural network 500 can be implemented using centralized learning, distributed learning, federated learning, hierarchical federated learning, and/or any other suitable learning technique.

As noted above, systems and techniques are described herein for performing signal synchronization for over-the-air (OTA) aggregation in a federated learning framework. In some aspects, the systems and techniques can be implemented by a network entity such as a base station (e.g., base station 102) or a component of a disaggregated base station (e.g., a centralized unit (CU) 310, a distributed unit (DU) 330, a radio unit (RU) 340, and/or a core network 320). In some examples, the systems and techniques can be implemented by a user equipment (UE) such as UE 104. In some cases, the systems and techniques can be used to compensate or adjust for a phase or time difference among signals transmissions by multiple UEs. In some aspects, adjusting a signal transmission to compensate for a phase or time difference can facilitate over-the-air (OTA) aggregation of model parameter updates from multiple UEs.

Figure 7:
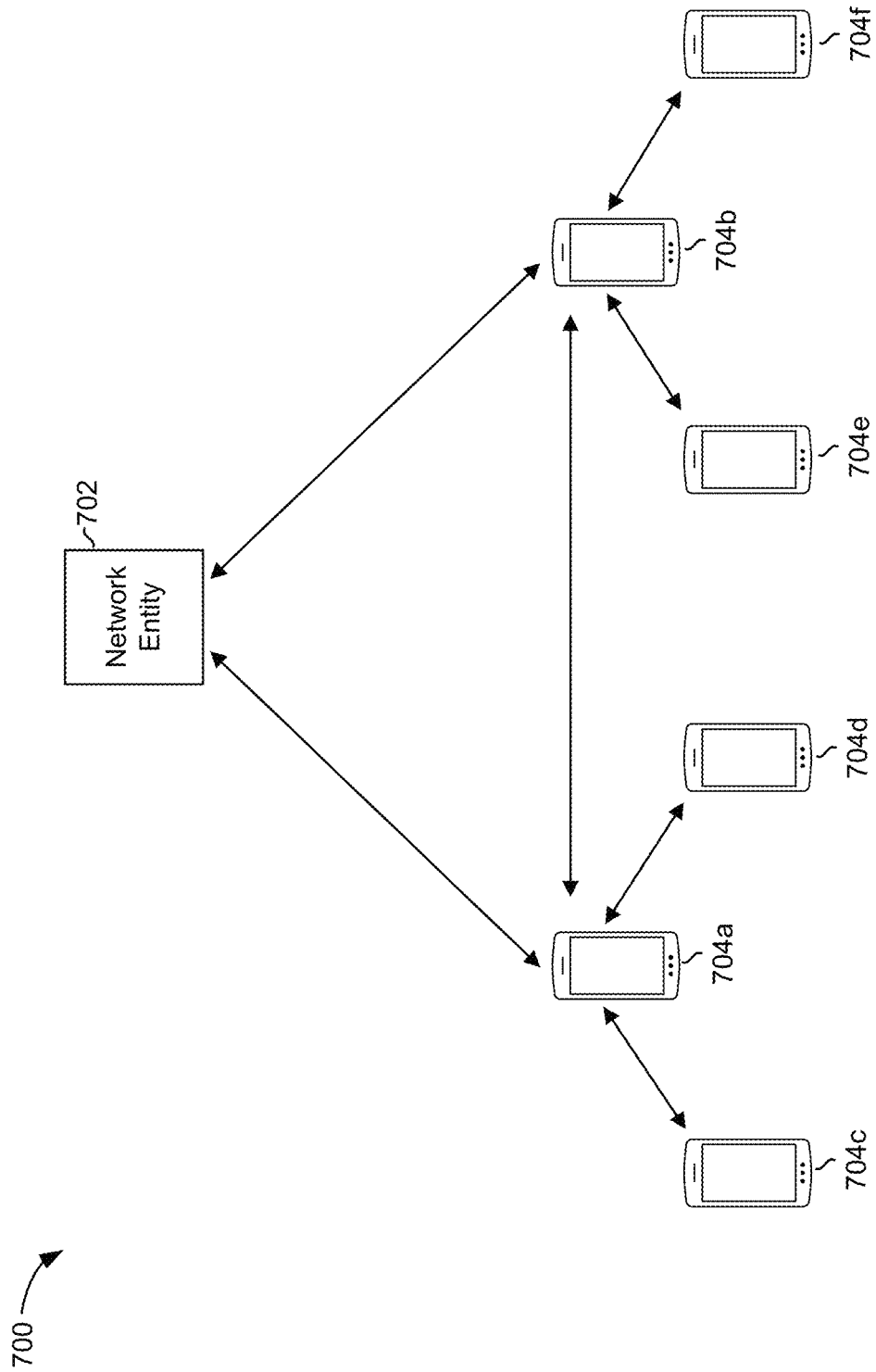
FIG. 7 is a block diagram illustrating another example of a wireless communication network, in accordance with some examples.

FIG. 7 illustrates an example of a wireless communication system 700 including devices configured to perform federated learning. While the system 700 is described using user equipment (UE) and network entities as illustrative examples, the techniques described with respect to the system 700 can be performed by base stations, Wi-Fi stations (STA), access points (APs), components of a disaggregated base station, or by other devices that communicate using other communication protocols.

In some aspects, the system 700 may include a network entity 702. In some cases, network entity 702 can include macro cell base stations and/or small cell base stations, as described in connection with system 100 (e.g., base stations 102). In other aspects, network entity 702 can include a wireless access point, such as, for example, AP 150 described in connection with system 100. In some examples, network entity 702 can correspond to components of a disaggregated base station, such as, for example, CU 310, DU 330, and/or RU 340, as described in connection with system 300.

In some examples, system 700 can include one or more user equipment (UE) devices, such as UE 704*a*, UE 704*b*, UE 704*c*, UE 704*d*, UE 704*e*, and UE 704*f*. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some aspects, a UE can include a mobile telephone or so-called "smart phone", a tablet computer, a wearable device, an extended reality device (e.g., a virtual reality (VR) device, an augmented reality (AR) device, or a mixed reality (MR) device), a personal computer, a laptop computer, an internet of things (IoT) device, a television, a vehicle (or a computing device of a vehicle), or any other device having a radio frequency (RF) interface.

In some aspects, UE 704*a* and UE 704*b* can communicate with network entity 702 in uplink (UL) and/or downlink (DL) directions. DL refers to the transmission direction from network entity 702 to a UE (e.g., UE 704*a*, UE 704*b*), and UL refers to the transmission direction from a UE (e.g., UE 704*a*, UE 704*b*) to network entity 702. In some examples, one or more of the UEs may utilize sidelink communications to communicate directly with each other. As illustrated, UE 704c and UE 704d may use sidelink to communicate with UE 704a, and UE 704e and UE 704f may use sidelink to communicate with UE 704b.

In some aspects, one or more of the UEs (e.g., UE 704a-UE 704f) in system 700 can be configured to perform federated training (e.g., federated learning) of a machine learning model. In some examples, the UEs may perform federated training of a machine learning model using local or private data. In some aspects, the input data used by a UE to train a machine learning model can include any type of data stored on the UE. For example, the input data used by a UE to train a machine learning model may include image data, video data, audio data, geolocation data, browsing data, financial data, demographic data, application data, usage data, network data, social media data, any other type of data, and/or any combination thereof. In some cases, model parameter updates (e.g., determined by the UEs) may be aggregated by a network entity that may include a parameter server (e.g., network entity 702).

In some aspects, system 700 can be configured to perform over-the-air (OTA) aggregation of model parameter updates from two or more UEs (e.g., UE 704a-UE 704f). In some cases, OTA aggregation can be used to reduce system overhead associated with training a machine learning model. For example, OTA aggregation can be used to reduce the number of utilized resources while transmitting individual model parameter updates (e.g., $F_K(\theta)$) that the model parameter server receives and processes. In some aspects, OTA aggregation may be performed by configuring multiple UEs to transmit model parameter updates using the same transmission resources (e.g., time and frequency resources). For example, UE 704a and UE 704b can be configured to transmit model parameter updates using the same resource allocation in a multiple access channel (e.g., Physical Uplink Shared Channel (PUSCH)) such that the respective model parameter updates are aggregated (e.g., $\Sigma_{k=1}^{K} n_k/nF_k(\theta)$) based on the simultaneous transmission.

In some aspects, OTA aggregation can be performed by inverting one or more sub-channels (e.g., based on power control) such that model parameter updates transmitted by different UEs can be received with the same or similar amplitudes. In some examples, OTA aggregation can be performed based on channel state information (CSI) associated with the transmitter. In some cases, OTA aggregation may be performed when the CSI corresponding to the transmitter is greater than or equal to a CSI threshold. In some aspects, UE 704a and UE 704b may transmit model parameter update 'x' and CSI 'h' (e.g., x/h) to network entity 702, and network entity 702 may determine model parameter update 'x' (e.g., or a noisy 'x' denoted as x+n) based on the CSI. In some cases, OTA aggregation can result in amplitude alignment of the transmitted signals at the receiver (e.g., network entity 702).

In some examples, OTA aggregation may be performed by synchronizing the transmission of signals among UEs implementing OTA aggregation. For example, UE 704a and UE 704b may synchronize one or more uplink channel transmissions (e.g., PUSCH transmissions) that include model parameter updates. In some aspects, synchronizing the transmission of signals may include synchronizing a time parameter and/or a phase parameter associated with the transmission. In some cases, synchronizing the time parameter and/or phase parameter associated with a signal transmission can include performing synchronization among a UE (e.g., UE 704a-UE 704f) and a base station (e.g., network entity 702). In some examples, synchronizing the time parameter and/or the phase parameter associated with a signal transmission can include performing synchronization among two or more UEs (e.g., UE 704a-UE 704f).

In some cases, OTA aggregation may be performed based on a UE capability. For example, a UE may be configured to implement OTA aggregation based on a signal phase continuity capability. In some aspects, a signal phase continuity capability can include maintaining a signal phase when a UE switches from a transmit (TX) mode to a receive (RX) mode or vice-versa. In some examples, a signal phase continuity capability may be related to UE hardware and/or UE software. For instance, a UE may maintain phase continuity while switching between RX mode and TX mode by utilizing a local oscillator that operates at a same frequency for upconverting signals and downconverting signals (e.g., local oscillator does not change frequency when switching modes). In another example, a UE may maintain phase continuity by implementing distinct paths for TX and RX (e.g., TX local oscillator does not change frequency during RX mode). In some cases, a UE may maintain phase continuity by implementing a phase locked loop (PLL) that is configured to maintain a same phase while switching frequencies.

In some examples, UE 704a and UE 704b may perform signal synchronization for OTA aggregation by transmitting an uplink reference signal (RS) to network entity 702. In some cases, the uplink RS can include a demodulation reference signal (DMRS), a phase tracking reference signal (PTRS), a sounding reference signal (SRS), and/or any other suitable RS. In some aspects, network entity 702 can receive the uplink RS from UE 704a and UE 704b and perform channel estimation. For example, network entity 702 can determine a signal phase based on measurements of the respective uplink reference signals received from UE 704a and UE 704b. In some configurations, network entity 702 can provide an indication of the signal phase and/or other channel parameters to UE 704a and UE 704b. In some examples, the signal phase and/or other channel parameters can be included in channel state information (CSI) that is transmitted from network entity 702 to UE 704a and UE 704b.

In some cases, UE 704a and/or UE 704b may determine channel parameters (e.g., signal phase) of an uplink channel based on measurements of a downlink channel. For example, UE 704a and/or UE 704b can perform channel estimation of a downlink RS to determine parameters (e.g., signal phase) of a corresponding uplink RS (e.g., based on channel reciprocity).

In some examples, UE 704a and UE 704b can use the signal phase (e.g., obtained from network entity 702 or determined based on DL channel) to synchronize an uplink channel transmission that includes model parameter updates. For example, UE 704a and UE 704b can each adjust transmission of PUSCH based on respective signal phase parameter. As noted above, the uplink channel transmission from UE 704a and UE 704b can use the same resource allocation (e.g., time and frequency resources). In some cases, the synchronized transmission form UE 704a and UE 704b can be used to implement OTA aggregation of the model parameter updates.

In some aspects, network entity 702 may configure a UE to implement OTA aggregation based on one or more UE capabilities. For example, network entity 702 can determine that UE 704a and UE 704b have a signal phase continuity capability (e.g., maintain signal phase when switching between TX and RX modes). In some aspects, a UE may signal one or more UE capabilities (e.g., signal phase continuity capability) to a base station. In some cases, a base station may determine UE capabilities based on data associated with the UE (e.g., a UE identifier). In some aspects, a base station may select UEs to implement OTA aggregation based on a signal phase continuity capability. For example, network entity 702 may configure UE 704a and UE 704b to perform OTA aggregation based on a signal phase continuity.

In some cases, one or more UEs may form a UE cluster or group for implementing OTA aggregation. For example, UE 704a, UE 704c, and UE 704d can form a first UE cluster and UE 704b, UE 704e, and UE 704f can form a second UE cluster. In some examples, a UE cluster can be formed based on sidelink communications among the UEs. In some cases, a base station may configure one or more UEs to form a UE cluster. In some aspects, a UE cluster may include one or more UEs that have different UE capabilities. For instance, UE 704a may have a signal phase continuity capability while UE 704c and UE 704d may not have a signal phase continuity capability.

In some cases, a UE cluster may have a UE cluster head that receives model parameter updates from other UEs in the UE cluster. For example, UE 704a can be configured as a UE cluster head and can receive model parameter updates from UE 704c and/or UE 704d. In another example, UE 704b can be configured as a UE cluster head and can receive model parameter updates from UE 704e and/or UE 704f. In some cases, the UE cluster head can be configured based on UE capabilities (e.g., signal phase continuity, processing capabilities, RF capabilities, etc.). In some aspects, a UE cluster head may be based on a geographic location of a UE relative to other UEs and/or a base station. In some cases, the UE cluster head can be configured by the base station. In some examples, the UE cluster head can be determined using sidelink communications among the respective UEs.

In some cases, a UE cluster head (e.g., UE 704a and/or UE 704b) can transmit model parameter updates from other UEs to network entity 702. For example, UE 704a can transmit a model parameter update received from UE 704c and UE 704b can simultaneously transmit a model parameter updated received from UE 704e. In some aspects, a UE cluster head may aggregate two or more model parameter updates prior to transmitting to network entity 702. For instance, UE 704a may aggregate a local model parameter update (e.g., determined by UE 704a) with model parameter updates received from UE 704c and/or UE 704d. In another example, UE 704b may aggregate a local model parameter update with model parameter updates received from UE 704e and/or UE 704f. In some aspects, UE 704a and UE 704b can transmit the aggregated model parameter updates (e.g., corresponding to respective cluster) using same time/frequency resources for OTA aggregation. In some examples, the model parameter updates from UE 704c, UE 704d, UE 704e, and UE 704d to a respective UE cluster head (e.g., UE 704a or UE 704b) may be transmitted using separate orthogonal links (e.g., without OTA aggregation).

In some examples, UE 704a and UE 704b may perform signal synchronization for OTA aggregation by performing inter-UE timing and phase synchronization. In some aspects, UE 704a can transmit a sidelink reference signal (RS) that can include a sidelink primary synchronization signal (S-PSS), a sidelink secondary synchronization signal (S-SSS), a sidelink channel state information reference signal (SL CSI-RS), a sidelink phase-tracking reference signal (SL PT-RS), a sidelink demodulation reference signal (SL DMRS) and/or any other suitable RS.

In some cases, the SL RS can be used by receiving UEs to estimate inter-UE timing and/or phase synchronization drift. For example, UE 704b can use the SL RS transmitted by UE 704a to determine a timing and/or phase synchronization drift between UE 704b and UE 704a. In some examples, UE 704b can send the timing and/or phase synchronization drift to UE 704a. In some aspects, UE 704a and/or UE 704 can use the inter-UE timing and/or phase synchronization drift to adjust an uplink transmission for OTA aggregation of model parameter updates. In some configurations, the inter-UE timing and/or phase synchronization drift can be used to adjust the signal phase associated with the uplink channel (e.g., obtained from network entity 702 and/or determined based on a DL channel).

In some aspects, UE 704a and UE 704b may determine inter-UE timing and/or phase synchronization drift using bi-directional RS transmissions. In some cases, UE 704a may transmit a forward link phase synchronization RS (e.g., via sidelink) to UE 704b and UE 704b may transmit a reverse link phase synchronization RS to UE 704a. In some examples, UE 704b may also transmit a forward link phase synchronization RS to UE 704a and UE 704a may transmit a reverse link phase synchronization RS to UE 704b. In some cases, the reverse link phase synchronization signal can be modulated with the forward link phase synchronization signal. In some cases, UE 704a and/or UE 704b can use signal parameters associated with the bi-directional reference signals to determine the inter-UE timing and/or phase synchronization drift. As noted above, the inter-UE timing and/or phase synchronization drift can be used to adjust an uplink transmission for OTA aggregation of model parameter updates (e.g., simultaneous uplink transmission by UE 704a and UE 704b).

In some examples, UE 704a and UE 704b may determine inter-UE timing and/or phase synchronization drift based on communications with network entity 702. In some cases, UE 704a and UE 704b may each transmit an uplink RS to network entity 702. In some aspects, network entity 702 can transmit a downlink RS to UE 704a and a downlink reference signal to UE 704b. In some cases, the downlink RS transmitted by network entity 702 can be modulated with their respective uplink RS. In some instances, UE 704a and UE 704b can receive the modulated downlink RS and determine the inter-UE timing and/or phase synchronization drift. In some examples, the inter-UE timing and/or phase synchronization drift can be used to synchronize uplink transmissions by UE 704a and UE 704b for OTA aggregation of model parameter updates (e.g., simultaneous uplink transmission by UE 704a and UE 704b).

In some aspects, network entity 702 can determine one or more phase drift parameters that can be used by a UE (e.g., UE 704 and/or UE 704b) to synchronize uplink transmissions by UE 704a and UE 704b for OTA aggregation of model parameter updates. In some cases, UE 704a and UE 704b can each transmit a sounding reference signal (SRS) to network entity 702. In some examples, network entity 702 can determine or calculate an uplink co-phasing parameter (e.g., UL precoding matrix indicator (PMI)) that is based on the SRS transmissions. In some examples, base station can provide the uplink co-phasing parameter to UE 704a and UE 704b. In some aspects, UE 704a and UE 704b can use the uplink co-phasing parameter to synchronize uplink transmissions for OTA aggregation of model parameter updates.

In some aspects, network entity 702 may calculate or determine a downlink co-phasing parameter. For instance, network entity 702 can transmit a CSI-RS to UE 704a and UE 704b. In some aspects, UE 704a can respond to the CSI-RS with channel state feedback (CSF) that can include a downlink phase parameter. In some examples, UE 704b can also respond to the CSI-RS with CSF that can also include a downlink phase parameter. In some cases, network entity 702 can determine the downlink co-phasing parameter (e.g., between UE 704a and UE 704b) based on the respective CSF received from UE 704a and UE 704b.

In some aspects, network entity 702 may use the downlink co-phasing parameter and the uplink co-phasing parameter to determine an optimized phase shift parameter. In some examples, network entity 702 can send the optimized phase shift parameter to UE 704a and UE 704b. In some cases, UE 704a and UE 704b can apply the optimized phase shift parameter during DL to UL reciprocity conversion (e.g., determining uplink channel parameters based on downlink channel parameters). In some instances, UE 704a and UE 704b can determine an UL precoder based on CSI-RS channel estimates and the optimized co-phasing parameter. In some examples, UE 704a and UE 704b can use the optimized co-phasing parameter to synchronize uplink transmissions for OTA aggregation of model parameter updates.

Figure 8:
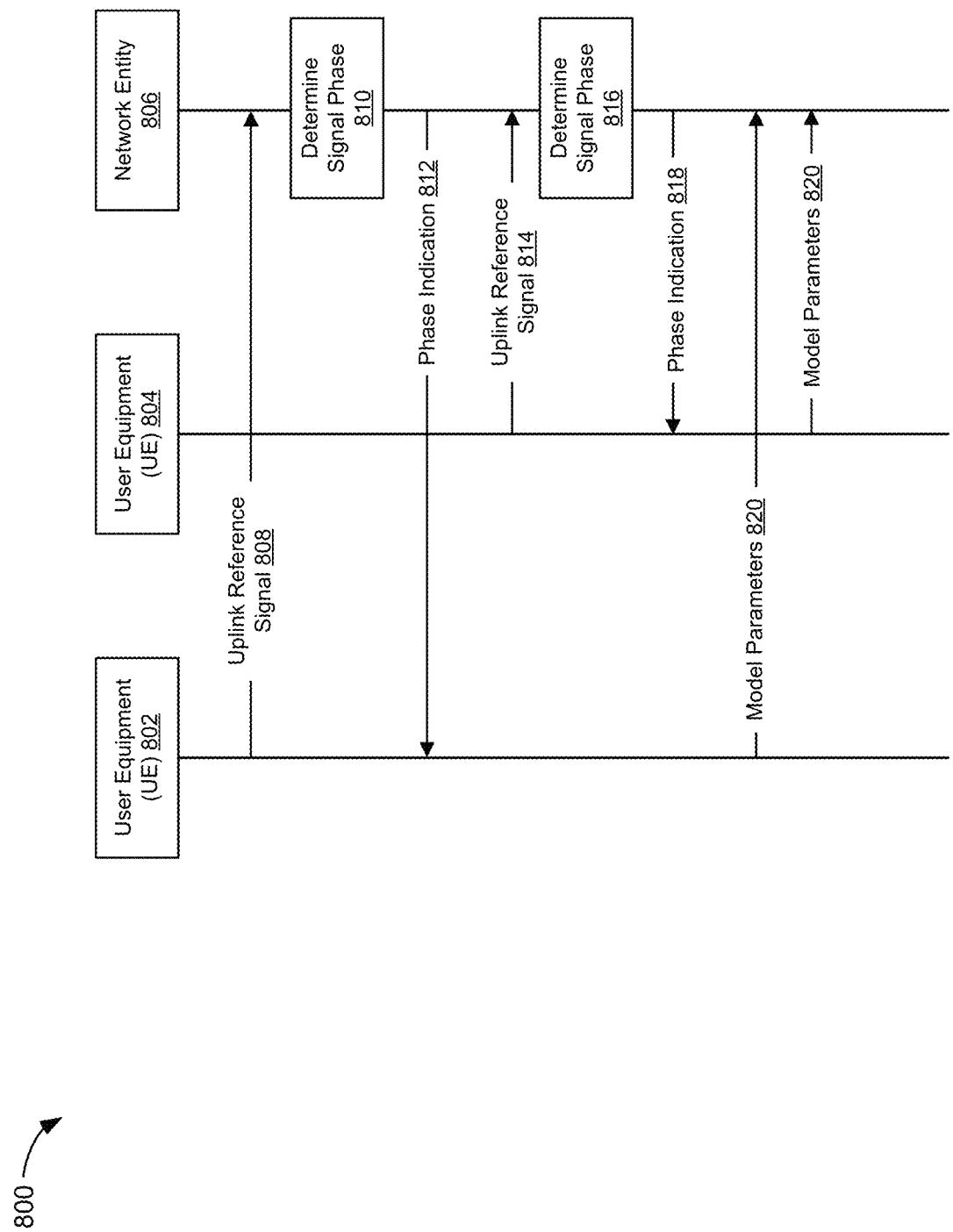
FIG. 8 is a sequence diagram illustrating an example sequence for performing signal synchronization for over-the-air (OTA) aggregation in federated learning framework, in accordance with some examples.

FIG. 8 is a sequence diagram illustrating an example of a sequence 800 for performing signal synchronization for over-the-air (OTA) aggregation in a federated learning framework. The sequence 800 may be performed by UE 802, UE 804, and network entity 806. At action 808, UE 802 can transmit an uplink reference signal (UL RS) to network entity 806. In some aspects, the UL RS can include a demodulation reference signal (DMRS), a phase tracking reference signal (PTRS), and/or a sounding reference signal (SRS). At action 810, network entity 806 can perform channel estimation and determine a signal phase parameter. At action 812, network entity 806 can transmit the signal phase parameter to UE 802. In some cases, the signal phase parameter can be included with channel state information (CSI). In some aspects, UE 802 may determine the signal phase parameter associated with the uplink channel based on measurements of a downlink channel (not illustrated in sequence 800).

At action 814, UE 804 can transmit an UL RS to network entity 806. At action 816, network entity 806 can perform channel estimation and determine a signal phase parameter corresponding to the UL RS transmission from UE 804. At action 818, network entity 806 can transmit the signal phase parameter to UE 804 (e.g., as part of CSI data). As noted with respect to UE 802, in some cases UE 804 may determine the signal phase parameter based on measurements of a downlink channel (not illustrated in sequence 800). In some cases, UE 802 and/or UE 804 may determine the signal phase parameter based on DL channel as an alternative to obtaining the signal phase parameter from network entity 806 (e.g., based on UL RS).

At action 820, UE 802 can transmit model parameter updates to network entity 806. At action 820, UE 804 can also transmit model parameter updates to network entity 806. In some aspects, the simultaneous transmissions by UE 802 and UE 804 can be used to perform over-the-air (OTA) aggregation of the respective model parameter updates. In some cases, UE 802 and UE 804 can synchronize the uplink channel transmissions based on the signal phase parameter received from network entity 806. In some examples, UE 802 and UE 804 may each be associated with one or more UE properties. For example, UE 802 and UE 804 may each have a signal phase continuity capability. In some instances, a UE having a signal phase continuity capability can maintain signal phase while switching from a transmit mode to a receive mode and while switching from a receive mode to a transmit mode.

Figure 9:
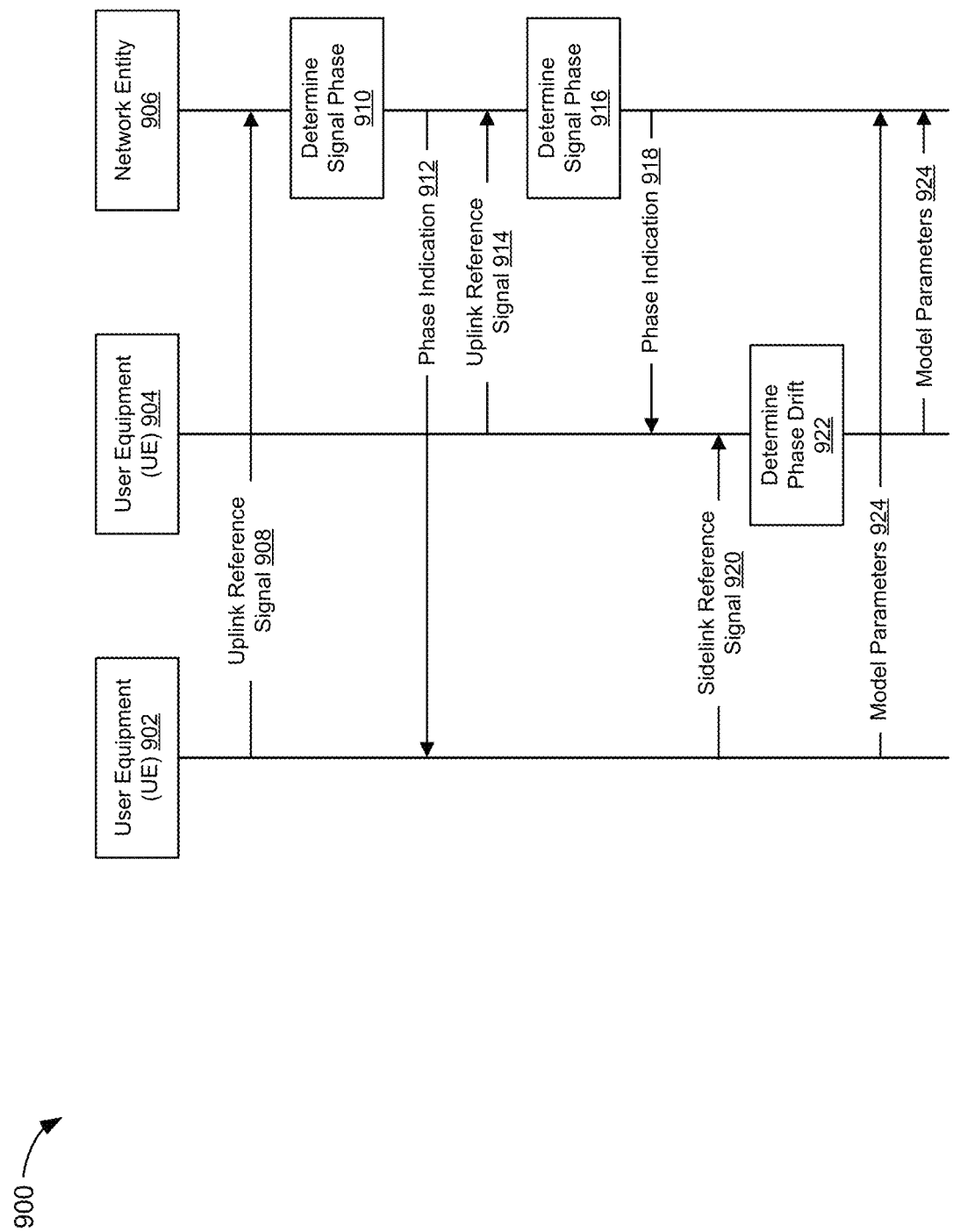
FIG. 9 is a sequence diagram illustrating another example sequence for performing signal synchronization for OTA aggregation in federated learning framework, in accordance with some examples.

FIG. 9 is a sequence diagram illustrating an example of a sequence 900 for performing signal synchronization for over-the-air (OTA) aggregation in a federated learning framework. The sequence 900 may be performed by UE 902, UE 904, and network entity 906. At action 908, UE 902 can transmit an uplink reference signal (UL RS) to network entity 906. At action 910, network entity 906 can perform channel estimation and determine a signal phase parameter. At action 912, network entity 906 can transmit the signal phase parameter to UE 902. In some cases, the signal phase parameter can be included with channel state information (CSI).

At action 914, UE 904 can transmit an UL RS to network entity 906. At action 916, network entity 906 can perform channel estimation and determine a signal phase parameter corresponding to the UL RS transmission from UE 904. At action 918, network entity 906 can transmit the signal phase parameter to UE 904 (e.g., as part of CSI data).

At action 920, UE 902 can transmit a sidelink reference signal (SL RS) to UE 904. In some aspects, the SL RS can include a sidelink primary synchronization signal (S-PSS), a sidelink secondary synchronization signal (S-SSS), a sidelink channel state information reference signal (SL CSI-RS), a sidelink phase-tracking reference signal (SL PT-RS), a sidelink demodulation reference signal (SL DMRS) and/or any other suitable RS.

At action 922, UE 904 can use the SL RS to determine a phase drift parameter (e.g., inter-UE timing and phase synchronization drift). In some aspects, the phase drift parameter can be used by UE 904 to synchronize uplink transmissions by UE 904 and UE 902 for OTA aggregation of model parameter updates. At action 924, UE 902 and UE 904 can simultaneously transmit model parameter updates for OTA aggregation to network entity 906. In some aspects, the transmissions by UE 902 and UE 904 can be synchronized based on the signal phase parameter (e.g., received from network entity 906) and/or the phase drift parameter (e.g., determined by UE 904).

Figure 10:
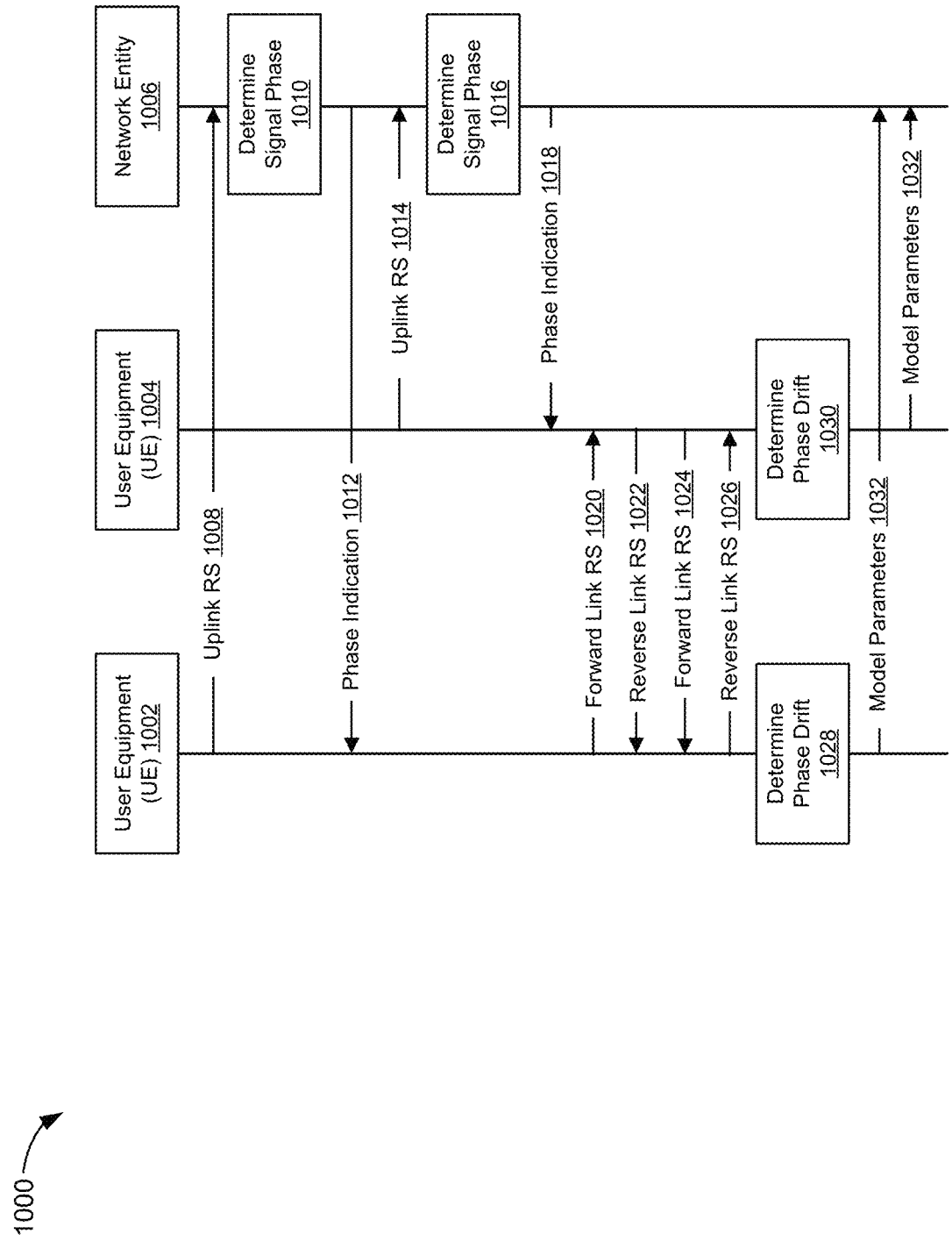
FIG. 10 is a sequence diagram illustrating another example sequence for performing signal synchronization for OTA aggregation in federated learning framework, in accordance with some examples.

FIG. 10 is a sequence diagram illustrating an example of a sequence 1000 for performing signal synchronization for over-the-air (OTA) aggregation in a federated learning framework. The sequence 1000 may be performed by UE 1002, UE 1004, and network entity 1006. At action 1008, UE 1002 can transmit an uplink reference signal (UL RS) to network entity 1006. At action 1010, network entity 1006 can perform channel estimation and determine a signal phase parameter. At action 1012, network entity 1006 can transmit the signal phase parameter to UE 1002. In some cases, the signal phase parameter can be included with channel state information (CSI).

At action 1014, UE 1004 can transmit an UL RS to network entity 1006. At action 1016, network entity 1006 can perform channel estimation and determine a signal phase parameter corresponding to the UL RS transmission from UE 1004. At action 1018, network entity 1006 can transmit the signal phase parameter to UE 1004 (e.g., as part of CSI data).

At action 1020, UE 1002 can transmit a forward link reference signal (e.g., via sidelink) to UE 1004. At action 1022, UE 1004 can transmit a reverse link reference signal (e.g., via sidelink) to UE 1002. In some aspects, the reverse link reference signal can be modulated with the forward link reference signal.

At action 1024, UE 1004 can transmit a forward link reference signal (e.g., via sidelink) to UE 1002. At action 1026, UE 1002 can transmit a reverse link reference signal (e.g., via sidelink) to UE 1004. In some aspects, the reverse link reference signal can be modulated with the forward link reference signal.

At action 1028, UE 1002 can determine a phase drift parameter (e.g., inter-UE timing and phase synchronization drift) based on the forward link and the reverse link reference signals. At action 1030, UE 1004 can also determine a phase drift parameter based on the forward link and the reverse link reference signals. In some aspects, the phase drift parameter can be used by UE 1002 and UE 1004 to synchronize uplink transmissions for OTA aggregation of model parameter updates.

At action 1032, UE 1002 and UE 1004 can simultaneously transmit model parameter updates for OTA aggregation to network entity 1006. In some aspects, the transmissions by UE 1002 and UE 1004 can be synchronized based on the signal phase parameter (e.g., received from network entity 1006) and/or the phase drift parameter(s) (e.g., determined by UE 1002 and 1004).

Figure 11:
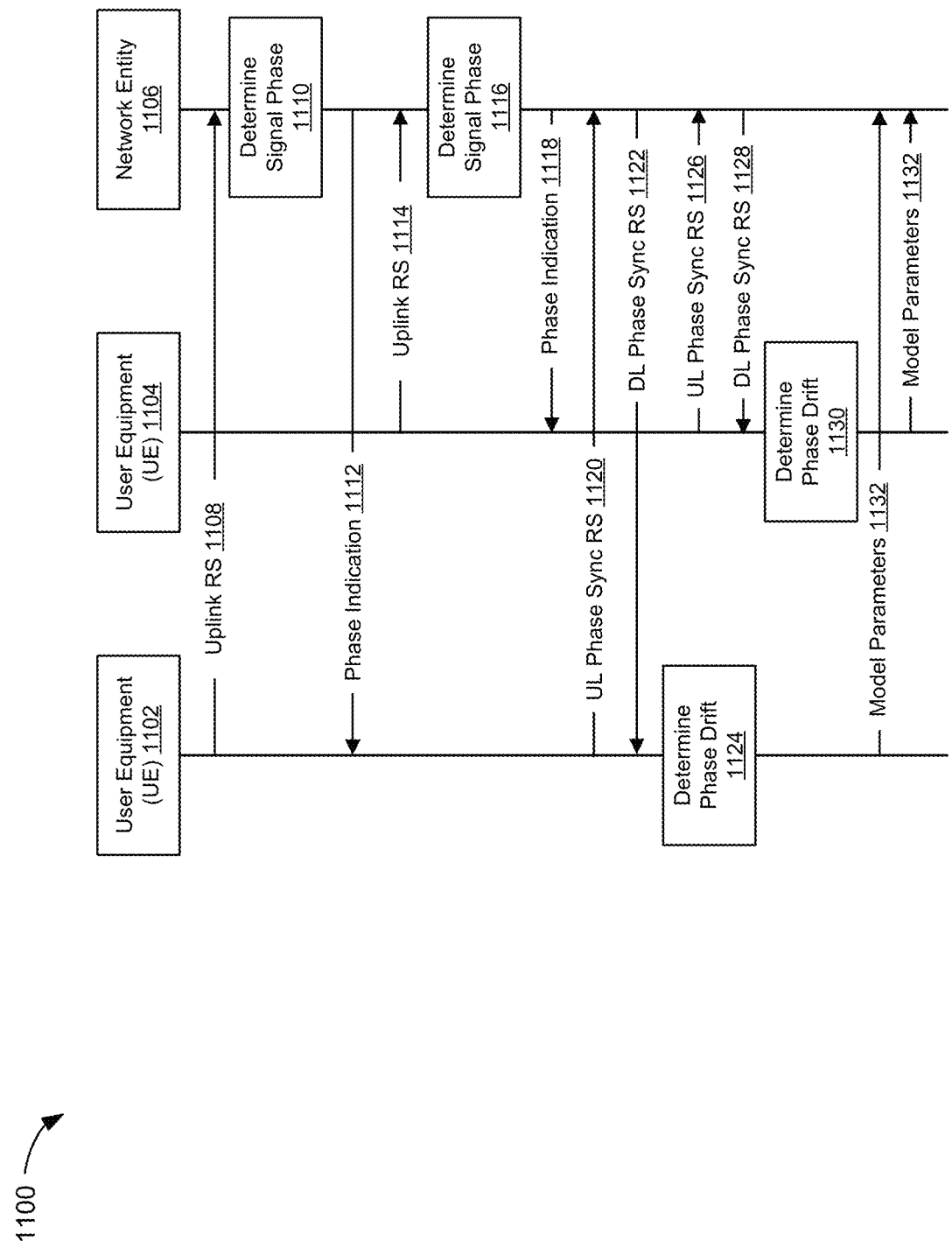
FIG. 11 is a sequence diagram illustrating another example sequence for performing signal synchronization for OTA aggregation in federated learning framework, in accordance with some examples.

FIG. 11 is a sequence diagram illustrating an example of a sequence 1100 for performing signal synchronization for over-the-air (OTA) aggregation in a federated learning framework. The sequence 1100 may be performed by UE 1102, UE 1104, and network entity 1106. At action 1108, UE 1102 can transmit an uplink reference signal (UL RS) to network entity 1106. At action 1110, network entity 1106 can perform channel estimation and determine a signal phase parameter. At action 1112, network entity 1106 can transmit the signal phase parameter to UE 1102. In some cases, the signal phase parameter can be included with channel state information (CSI).

At action 1114, UE 1104 can transmit an UL RS to network entity 1106. At action 1116, network entity 1106 can perform channel estimation and determine a signal phase parameter corresponding to the UL RS transmission from UE 1104. At action 1118, network entity 1106 can transmit the signal phase parameter to UE 1104 (e.g., as part of CSI data).

At action 1120, UE 1102 can transmit an uplink phase synchronization reference signal to network entity 1106. At action 1122, network entity 1106 can transmit a downlink phase synchronization reference signal to UE 1102. In some aspects, the downlink phase synchronization reference signal can be modulated with the uplink phase synchronization reference signal. At action 1124, UE 1102 can determine a phase drift parameter based on the downlink phase synchronization reference signal received from network entity 1106.

At action 1126, UE 1104 can transmit an uplink phase synchronization reference signal to network entity 1106. At action 1128, network entity 1106 can transmit a downlink phase synchronization reference signal to UE 1104. In some aspects, the downlink phase synchronization reference signal can be modulated with the uplink phase synchronization reference signal. At action 1130, UE 1104 can determine a phase drift parameter based on the downlink phase synchronization reference signal received from network entity 1106.

In some aspects, the phase drift parameter can be used by UE 1102 and UE 1104 to synchronize uplink transmissions for OTA aggregation of model parameter updates. At action 1132, UE 1102 and UE 1104 can simultaneously transmit model parameter updates for OTA aggregation to network entity 1106. In some aspects, the transmissions by UE 1102 and UE 1104 can be synchronized based on the signal phase parameter (e.g., received from network entity 1106) and/or the phase drift parameter(s) (e.g., determined by UE 1102 and 1104).

Figure 12:
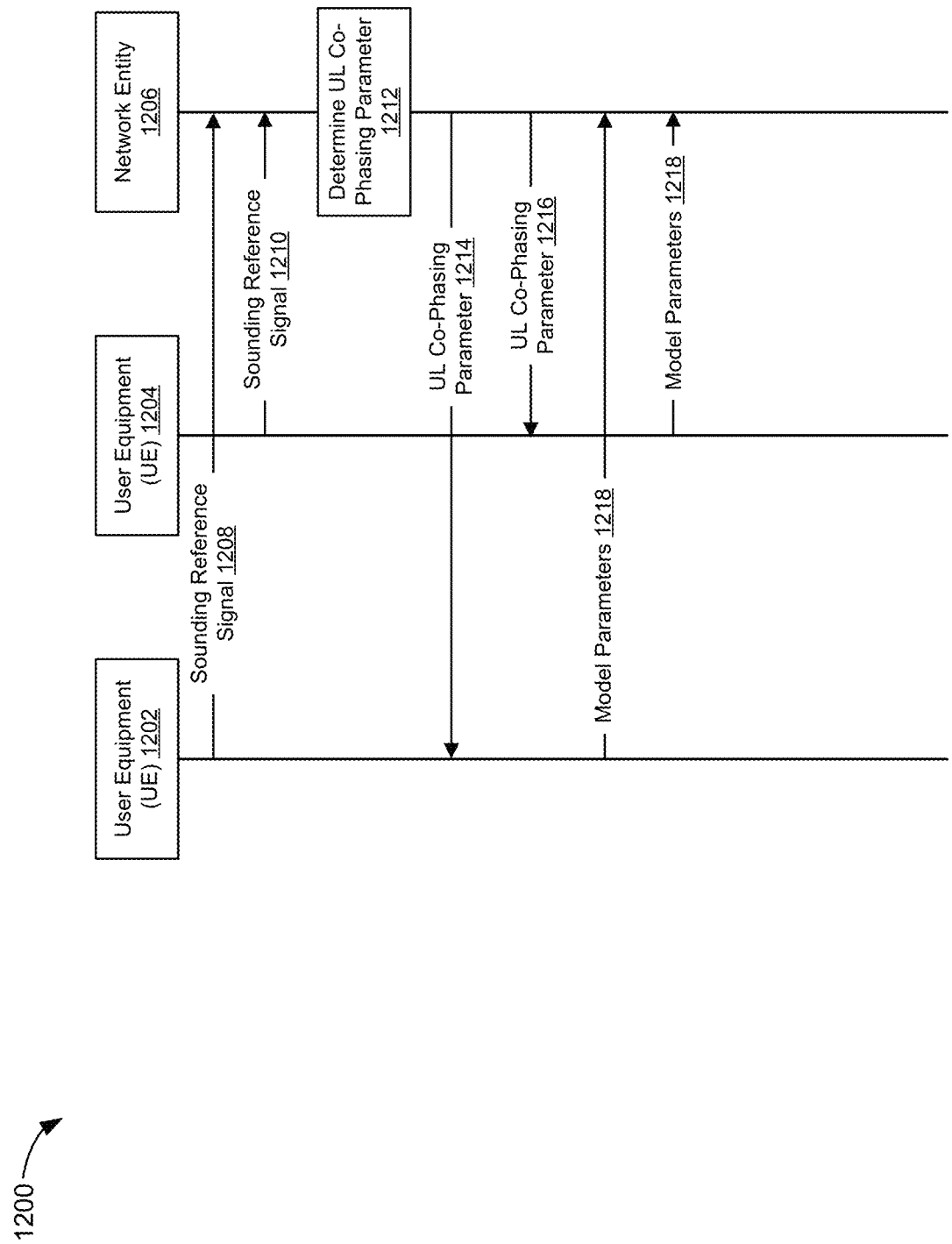
FIG. 12 is a sequence diagram illustrating another example sequence for performing signal synchronization for OTA aggregation in federated learning framework, in accordance with some examples.

FIG. 12 is a sequence diagram illustrating an example of a sequence 1200 for performing signal synchronization for over-the-air (OTA) aggregation in a federated learning framework. The sequence 1200 may be performed by UE 1202, UE 1204, and network entity 1206. At action 1208, UE 1202 can transmit a sounding reference signal (SRS) to network entity 1206. At action 1210, UE 1204 can transmit a SRS to network entity 1206.

At action 1212, network entity 1206 can determine an uplink co-phasing parameter between UE 1202 and UE 1204 (e.g., based on the respective SRS transmissions). At action 1214, network entity 1206 can transmit the co-phasing parameter to UE 1202. At action 1216, network entity 1206 can transmit the co-phasing parameter to UE 1204.

In some aspects, the co-phasing parameter can be used by UE 1202 and UE 1204 to synchronize uplink transmissions for OTA aggregation of model parameter updates. At action 1218, UE 1202 and UE 1204 can simultaneously transmit model parameter updates for OTA aggregation to network entity 1206. In some aspects, the transmissions by UE 1202 and UE 1204 can be synchronized based on the co-phasing parameter.

Figure 13:
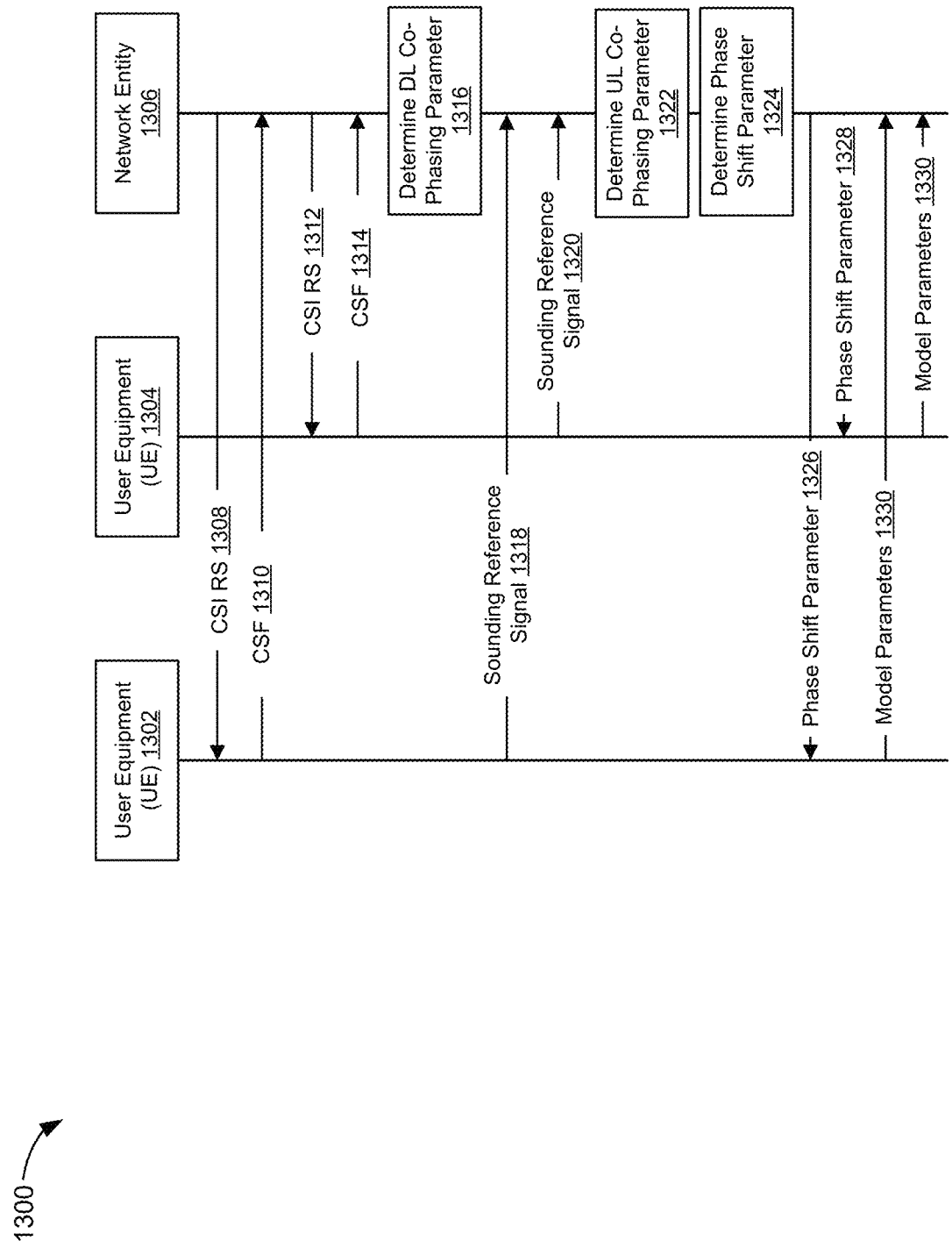
FIG. 13 is a sequence diagram illustrating another example sequence for performing signal synchronization for OTA aggregation in federated learning framework, in accordance with some examples.

FIG. 13 is a sequence diagram illustrating an example of a sequence 1300 for performing signal synchronization for over-the-air (OTA) aggregation in a federated learning framework. The sequence 1300 may be performed by UE 1302, UE 1304, and network entity 1306. At action 1308, network entity 1306 can transmit a channel state information reference signal (CSI-RS) to UE 1302. At action 1310, UE 1302 can respond to the CSI-RS with channel state feedback (CSF) that can include a downlink phase corresponding to CSI-RS.

At action 1312, network entity 1306 can transmit a CSI-RS to UE 1304. At action 1314, UE 1304 can respond to the CSI-RS with CSF that can include a downlink phase corresponding to CSI-RS. At action 1316, network entity 1306 can determine (e.g., compute) a downlink co-phasing parameter (e.g., based on CSF received from UE 1302 and UE 1304).

At action 1318, UE 1302 can transmit a sounding reference signal (SRS) to network entity 1306. At action 1320, UE 1304 can transmit an SRS to network entity 1306. At action 1322, network entity 1306 can determine an uplink co-phasing parameter between UE 1302 and UE 1304 (e.g., based on the respective SRS transmissions). At action 1324, network entity 1306 can use the downlink co-phasing parameter and the uplink co-phasing parameter to determine an optimized phase shift parameter.

At action 1326, network entity 1306 can send the optimized phase shift parameter to UE 1302. At action 1328, network entity 1306 can send the optimized phase shift parameter to UE 1304. In some cases, UE 1302 and UE 1304 can apply the optimized phase shift parameter during DL to UL reciprocity conversion. In some instances, UE 1302 and UE 1304 can determine an UL precoder based on CSI-RS channel estimates and the optimized co-phasing parameter. In some examples, UE 1302 and UE 1304 can use the optimized co-phasing parameter to synchronize uplink transmissions for OTA aggregation of model parameter updates. At action 1330, UE 1302 and UE 1304 can simultaneously transmit model parameter updates for OTA aggregation to network entity 1306. In some aspects, the transmissions by UE 1302 and UE 1304 can be synchronized based on the optimized phase shift parameter.

Figure 14:
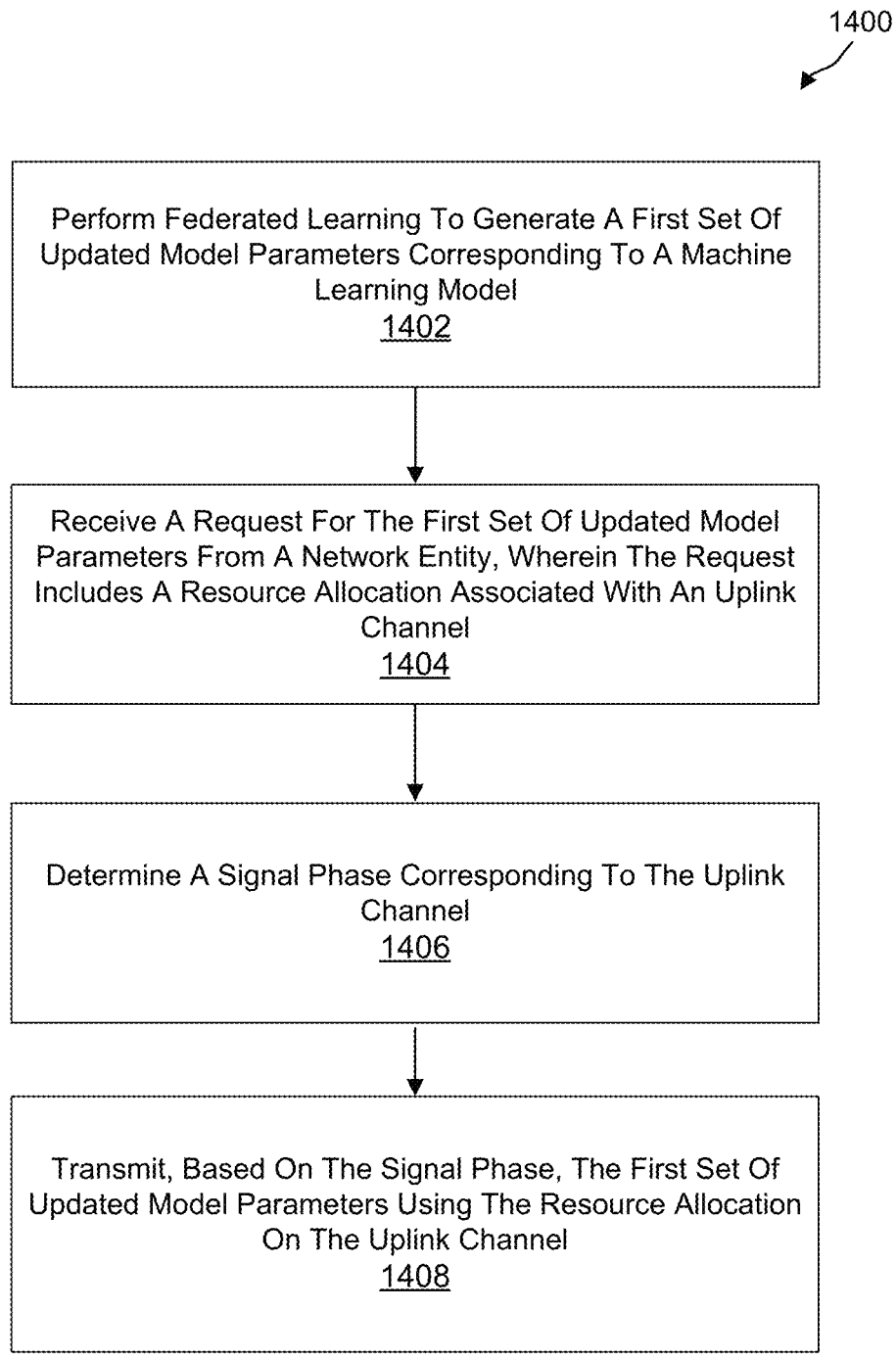
FIG. 14 is a flow diagram illustrating an example of a process for performing signal synchronization for OTA aggregation in federated learning framework, in accordance with some examples.

FIG. 14 is a flow diagram illustrating an example of a process 1400 for performing signal synchronization for over-the-air (OTA) aggregation in a federated learning framework. At block 1402, the process 1400 includes performing federated learning to generate a first set of updated model parameters corresponding to a machine learning model. For example, UE 704a can perform federated learning to generate a set of updated model parameters corresponding to a machine learning model.

At block 1404, the process 1400 includes receiving a request for the first set of updated model parameters from a network entity, wherein the request includes a resource allocation associated with an uplink channel. For instance, UE 704a can receive a request for the set of updated model parameters from network entity 702. In some aspects, the request can include or identify a resource allocation (e.g., time/frequency resources) for transmitting the set of updated model parameters to the network entity using an uplink channel (e.g., Physical Uplink Shared Channel (PUSCH)).

At block 1406, the process 1400 includes determining a signal phase corresponding to the uplink channel. For example, UE 704a can determine a signal phase corresponding to the uplink channel for transmitting the updated model parameters. In some cases, the signal phase is determined based on channel state information (CSI) received from the network entity. For example, network entity 702 can transmit CSI to UE 704a that includes the signal phase of the uplink channel (e.g., in response to transmission of an uplink reference signal). In some aspects, the signal phase is based on phase data associated with a corresponding downlink channel. For example, UE 704a can perform channel estimation of a downlink channel to determine the signal phase of an uplink channel (e.g., based on channel reciprocity).

At block 1408, the process 1400 includes transmitting, based on the signal phase, the first set of updated model parameters using the resource allocation on the uplink channel. For instance, UE 704a can transmit the set of updated model parameters using the resource allocation on the uplink channel. In some aspects, another UE (e.g., UE 704b) may simultaneously transmit a set of updated model parameters using the same resource allocation in order to implement over-the-air (OTA) aggregation of the respective sets of updated model parameters. In some examples, the first UE can be configured to preserve the signal phase during a signal transmission following a signal reception. For example, UE 704a can be equipped with hardware and/or software for implementing signal phase continuity (e.g., maintain signal phase while switching between receive and transmit modes).

In some cases, the process 1400 can include receiving a second set of updated model parameters from a second UE and combining the second set of updated model parameters with the first set of updated model parameters to yield a combined set of updated model parameters, wherein the transmitting the first set of updated model parameters includes transmitting the combined set of updated model parameters. For example, UE 704a can receive a second set of updated model parameters from UE 704c (e.g., via sidelink). In some aspects, UE 704a can combine the second set of updated model parameters with the first set of updated model parameters and transmit the combined set of updated model parameters. In some examples, the first UE is a cluster hear of a UE cluster that includes the first UE and the second UE. For instance, UE 704a can be the cluster head of a UE cluster that includes UE 704a, UE 704c, and UE 704d.

In some aspects, the process 1400 may include transmitting a first sidelink reference signal to at least one other UE, wherein the first sidelink reference signal provides a phase synchronization among the first UE and the at least one other UE for the uplink channel. For example, UE 704a can transmit a sidelink reference signal to UE 704b. In some aspects, the sidelink reference signal can be used to determine an inter-UE timing and/or phase synchronization drift. In some cases, the inter-UE timing and/or phase synchronization drift can be used to synchronize uplink transmissions by UE 704a and UE 704b for performing OTA aggregation of updated model parameters.

In some cases, the process 1400 can include receiving, from the at least one other UE, a second sidelink reference signal in response to the first sidelink reference signal. For example, UE 704a can receive a second sidelink reference signal in response to the first sidelink reference signal. In some cases, the second sidelink reference signal is modulated with the first sidelink reference signal. In some instances, the process 1400 can include determining a phase drift parameter based on the second sidelink reference signal and adjusting the signal phase based on the phase drift parameter. For example, UE 704a and UE 704b can determine an inter-UE timing and/or phase synchronization drift based on the bidirectional reference signals. In some aspects, UE 704a and UE 704b can adjust the signal phase (e.g., of the uplink transmission) based on the inter-UE timing and/or phase synchronization drift.

In some configurations, the process 1400 can include transmitting an uplink phase synchronization signal to the network entity and receiving a downlink phase synchronization signal in response to the uplink phase synchronization signal. For example, UE 704a can transmit an uplink phase synchronization signal to network entity 702 and receive a corresponding downlink phase synchronization signal from network entity 702. In some cases, the downlink phase synchronization signal can be modulated with the uplink phase synchronization signal. In some cases, the process 1400 can include determining a phase drift parameter based on the downlink phase synchronization signal and adjusting the signal phase based on the phase drift parameter. For example, UE 704a can determine a phase drift parameter (e.g., an inter-UE phase synchronization drift) and adjust the signal phase of the uplink channel transmission for OTA aggregation.

In some examples, the process 1400 can include transmitting an uplink phase synchronization signal to the network entity and receiving a phase drift parameter from the network entity, wherein the signal phase is based on the phase drift parameter. For example, UE 704a can transmit a sounding reference signal (SRS) to network entity 702. In some aspects, network entity 702 can calculate a phase drift parameter (e.g., UL co-phasing parameter) and send it to UE 704a.

In some cases, the process 1400 may include transmitting channel state feedback (CSF) in response to a channel state information reference signal (CSI-RS) received from the network entity, wherein the phase drift parameter is based on the CSF. For instance, UE 704a can receive a channel state information reference signal (CSI-RS) from network entity 702 and perform channel estimation to determine CSF. In some cases, UE 704a can transmit the CSF to network entity 702. In some examples, network entity 702 can use the CSF to determine a downlink (DL) co-phasing parameter. In some cases, network entity 702 can use the UL co-phasing parameter and the DL co-phasing parameter to determine the phase drift parameter.

Figure 15:
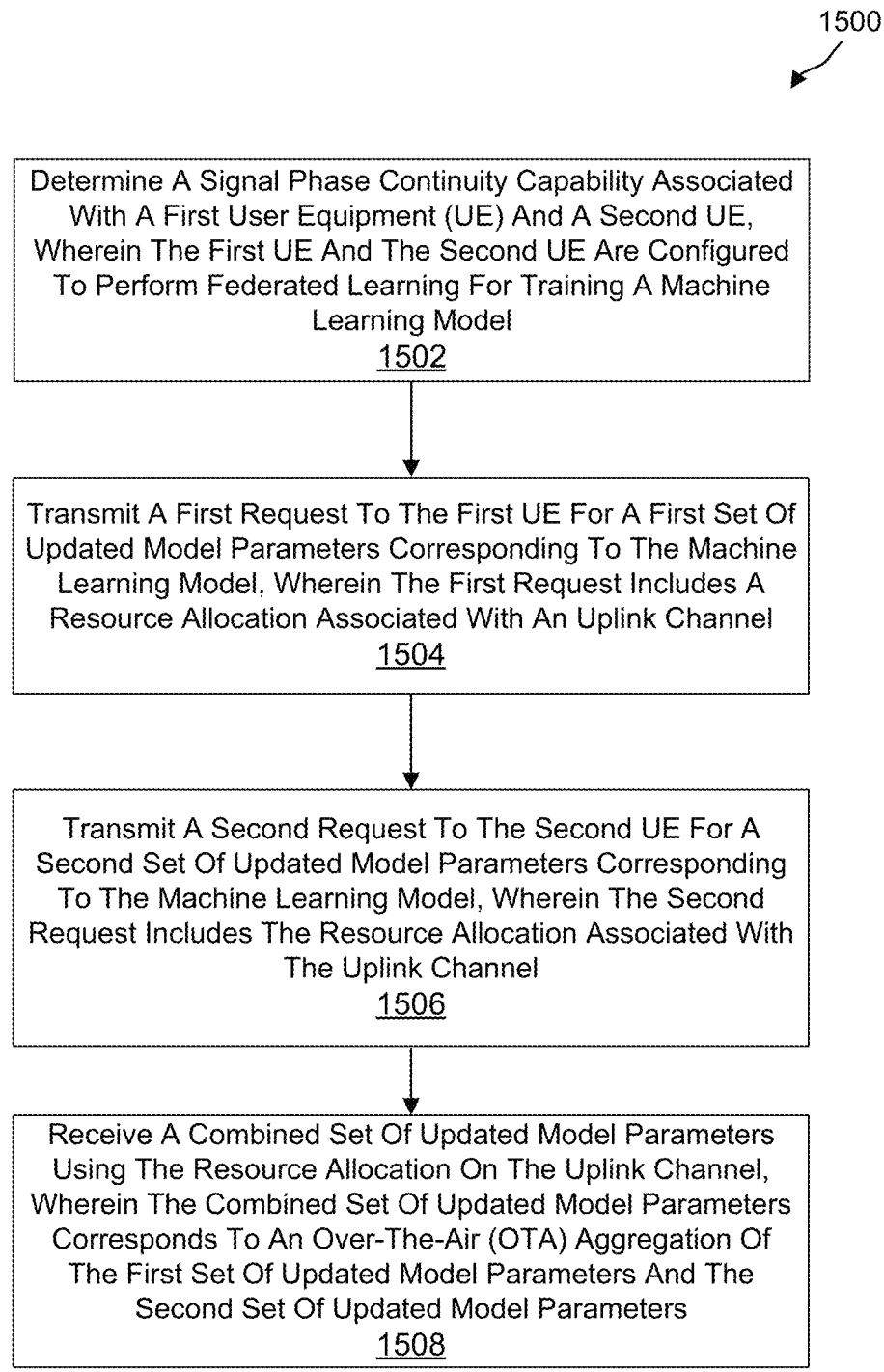
FIG. 15 is a flow diagram illustrating another example of a process for performing signal synchronization for OTA aggregation in federated learning framework, in accordance with some examples.

FIG. 15 is a flow diagram illustrating an example of a process 1500 for performing signal synchronization for over-the-air (OTA) aggregation in a federated learning framework. In some aspects, process 1500 can be performed by a network entity such as a base station (e.g., base stations 102) or a component of a disaggregated base station (e.g., central unit (CU) 310, distributed unit (DU) 330, and/or radio unit (RU) 340). At block 1502, the process 1500 includes determining a signal phase continuity capability associated with a first user equipment (UE) and a second UE, wherein the first UE and the second UE are configured to perform federated learning for training a machine learning model. For example, network entity 702 can determine a signal phase continuity capability associated with UE 704a and UE 704b. In some aspects, the signal phase continuity capability permits a UE to maintain a signal phase (e.g., associated with an uplink channel) while switching between a receive mode and a transmit mode. In some cases, UE 704a and UE 704b can be configured to perform federated learning for training a machine learning model.

At block 1504, the process 1500 includes transmitting a first request to the first UE for a first set of updated model parameters corresponding to the machine learning model, wherein the first request includes a resource allocation associated with an uplink channel. For example, network entity 702 can send a request to UE 704a for transmission of a first set of updated model parameters. In some aspects, the request can include or identify time/frequency resources for transmitting the updated model parameters using an uplink shared channel.

At block 1506, the process 1500 includes transmitting a second request to the second UE for a second set of updated model parameters corresponding to the machine learning model, wherein the second request includes the resource allocation associated with the uplink channel. For instance, network entity 702 can send a request to UE 704b for transmission of a second set of updated model parameters. In some aspects, the request can include or identify the same time/frequency resources that were included in the request sent to UE 704a (e.g., simultaneous transmission for OTA aggregation).

At block 1508, the process 1500 includes receiving a combined set of updated model parameters using the resource allocation on the uplink channel, wherein the combined set of updated model parameters corresponds to an over-the-air (OTA) aggregation of the first set of updated model parameters and the second set of updated model parameters. For example, UE 702 can receive a combined set of updated model parameters using the time/frequency resources that were signaled to UE 704a and UE 704b. In some aspects, the combined set of updated model parameters can correspond to and OTA aggregation of the first set of updated model parameters from UE 704a and the second set of updated model parameters from UE 704b.

In some examples, the first UE can be a cluster head of a UE cluster that includes a plurality of UEs, wherein the first set of updated model parameters corresponds to the UE cluster. For example, UE 704a can be a cluster head of a UE cluster that includes UE 704a, UE 704c, and UE 704d. In some cases, the first set of updated model parameters can correspond to aggregated model parameters from each UE in the UE cluster.

In some cases, the process 1500 can include receiving an uplink phase synchronization signal from the first UE and transmitting a downlink phase synchronization signal in response to the uplink phase synchronization signal, wherein the downlink phase synchronization signal provides phase synchronization for the uplink channel. For instance, network entity 702 can receive an uplink phase synchronization signal from UE 704a. In response, network entity 702 can transmit a downlink phase synchronization signal to UE 704a. In some examples, the downlink phase synchronization signal can be modulated with the uplink phase synchronization signal.

In some examples, the process 1500 can include determining a phase drift parameter based on an uplink phase synchronization signal received from the first UE, wherein the phase drift parameter provides a phase synchronization for the uplink channel. For example, network entity 702 can determine an uplink co-phasing parameter based on a sounding reference signal (SRS) received from UE 704a.

In some cases, the process 1500 can include receiving channel state feedback (CSF) in response to a channel state information reference signal (CSI-RS), wherein the phase drift parameter is further based on the CSF. For instance, network entity 702 can receive CSF from UE 704a in response to a CSI-RS signal. In some aspects, network entity 702 can determine a downlink co-phasing parameter based on the CSF. In some cases, network entity 702 can determine an optimized phase drift parameter based on the UL co-phasing parameter and the DL co-phasing parameter.

In some examples, the processes described herein (e.g., sequence 800, sequence 900, sequence 1000, sequence 1100, sequence 1200, sequence 1300, process 1400, process 1500 and/or other process described herein) may be performed by a computing device or apparatus (e.g., a UE or a base station). In one example, the process 1500 can be performed by the base station 102 of FIG. 2, the RU 340 of FIG. 3, the DU 330 of FIG. 3, and/or the CU 310 of FIG. 3. In another example, the process 1400 may be performed by the user equipment (UE) 104 of FIG. 2. In some aspects, the process 1400 and/or the process 1500 can be performed by a computing device with the computing system 1600 shown in FIG. 16.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, neural processing units (NPUs), graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The sequence 800, sequence 900, sequence 1000, sequence 1100, sequence 1200, sequence 1300, process 1400, and process 1500 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, sequence 800, sequence 900, sequence 1000, sequence 1100, sequence 1200, sequence 1300, process 1400, process 1500 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 16:
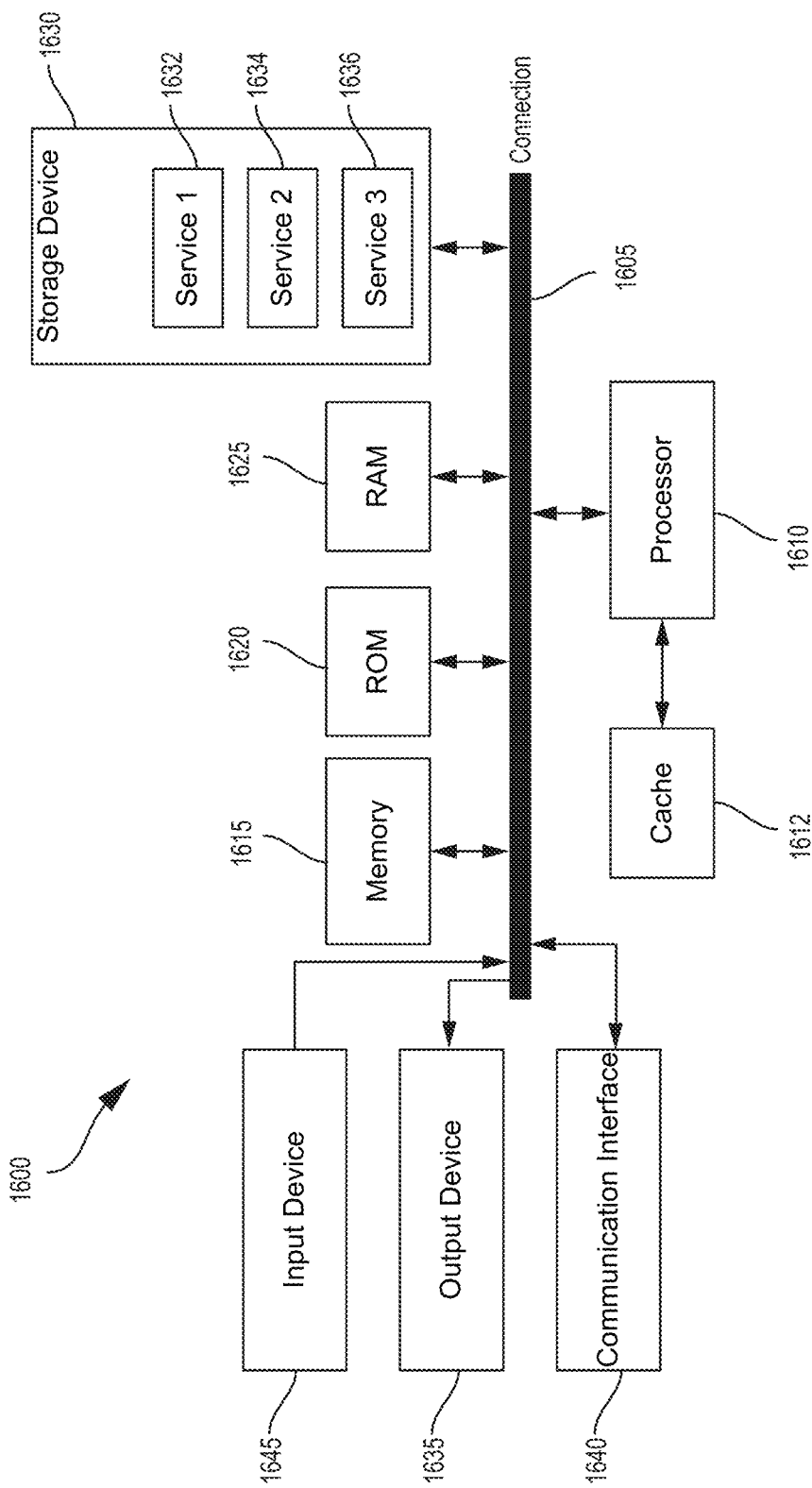
FIG. 16 is a block diagram illustrating an example of a computing system, in accordance with some examples.

FIG. 16 is a diagram illustrating an example of a system for implementing certain aspects of the present technology. In particular, FIG. 16 illustrates an example of computing system 1600, which may be for example any computing device making up internal computing system, a remote computing system, a camera, or any component thereof in which the components of the system are in communication with each other using connection 1605. Connection 1605 may be a physical connection using a bus, or a direct connection into processor 1610, such as in a chipset architecture. Connection 1605 may also be a virtual connection, networked connection, or logical connection.

In some embodiments, computing system 1600 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1600 includes at least one processing unit (CPU or processor) 1610 and connection 1605 that communicatively couples various system components including system memory 1615, such as read-only memory (ROM) 1620 and random access memory (RAM) 1625 to processor 1610. Computing system 1600 may include a cache 1612 of high-speed memory connected directly with, in close proximity to, or integrated as part of processor 1610.

Processor 1610 may include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which may represent any number of input mechanisms, such as a microphone for speech, a touch-sensitive screen for gesture or graphical input, keyboard, mouse, motion input, speech, etc. Computing system 1600 may also include output device 1635, which may be one or more of a number of output mechanisms. In some instances, multimodal systems may enable a user to provide multiple types of input/output to communicate with computing system 1600.

Computing system 1600 may include communications interface 1640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1630 may include software services, servers, services, etc., that when the code that defines such software is executed by the processor 1610, it causes the system to perform a function. In some embodiments, a hardware service that performs a particular function may include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A method for wireless communications performed at a first user equipment (UE), comprising: performing federated learning to generate a first set of updated model parameters corresponding to a machine learning model; receiving a request for the first set of updated model parameters from a network entity, wherein the request includes a resource allocation associated with an uplink channel; determining a signal phase corresponding to the uplink channel; and transmitting, based on the signal phase, the first set of updated model parameters using the resource allocation on the uplink channel.

Aspect 2. The method of Aspect 1, wherein the signal phase is based on channel state information (CSI) received from the network entity.

Aspect 3. The method of any of Aspects 1 to 2, wherein the signal phase is based on phase data associated with a corresponding downlink channel.

Aspect 4. The method of any of Aspects 1 to 3, wherein the first UE is configured to preserve the signal phase during a signal transmission following a signal reception.

Aspect 5. The method of any of Aspects 1 to 4, further comprising: receiving a second set of updated model parameters from a second UE; and combining the second set of updated model parameters with the first set of updated model parameters to yield a combined set of updated model parameters, wherein the transmitting the first set of updated model parameters includes transmitting the combined set of updated model parameters.

Aspect 6. The method of Aspect 5, wherein the first UE is a cluster head of a UE cluster that includes the first UE and the second UE.

Aspect 7. The method of any of Aspects 1 to 6, further comprising: transmitting a first sidelink reference signal to at least one other UE, wherein the first sidelink reference signal provides a phase synchronization among the first UE and the at least one other UE for the uplink channel.

Aspect 8. The method of Aspect 7, further comprising: receiving, from the at least one other UE, a second sidelink reference signal in response to the first sidelink reference signal; determining a phase drift parameter based on the second sidelink reference signal; and adjusting the signal phase based on the phase drift parameter.

Aspect 9. The method of any of Aspects 1 to 8, further comprising: transmitting an uplink phase synchronization signal to the network entity; receiving a downlink phase synchronization signal in response to the uplink phase synchronization signal; determining a phase drift parameter based on the downlink phase synchronization signal; and adjusting the signal phase based on the phase drift parameter.

Aspect 10. The method of any of Aspects 1 to 9, further comprising: transmitting an uplink phase synchronization signal to the network entity; and receiving a phase drift parameter from the network entity, wherein the signal phase is based on the phase drift parameter.

Aspect 11. The method of Aspect 10, further comprising: transmitting channel state feedback (CSF) in response to a channel state information reference signal (CSI-RS) received from the network entity, wherein the phase drift parameter is based on the CSF.

Aspect 12. An apparatus for wireless communications, comprising: at least one memory; and at least one processor coupled to the at least one memory, wherein the at least one processor is configured to perform operations in accordance with any one of Aspects 1-11.

Aspect 13. An apparatus for wireless communications, comprising means for performing operations in accordance with any one of Aspects 1 to 11.

Aspect 14: A non-transitory computer-readable medium comprising instructions that, when executed by an apparatus, cause the apparatus to perform operations in accordance with any one of Aspects 1 to 11.

Aspect 15. A method for wireless communications performed at a network entity, comprising: determining a signal phase continuity capability associated with a first user equipment (UE) and a second UE, wherein the first UE and the second UE are configured to perform federated learning for training a machine learning model; transmitting a first request to the first UE for a first set of updated model parameters corresponding to the machine learning model, wherein the first request includes a resource allocation associated with an uplink channel; transmitting a second request to the second UE for a second set of updated model parameters corresponding to the machine learning model, wherein the second request includes the resource allocation associated with the uplink channel; and receiving a combined set of updated model parameters using the resource allocation on the uplink channel, wherein the combined set of updated model parameters corresponds to an over-the-air (OTA) aggregation of the first set of updated model parameters and the second set of updated model parameters.

Aspect 16. The method of Aspect 15, wherein the first UE is a cluster head of a UE cluster that includes a plurality of UEs, and wherein the first set of updated model parameters corresponds to the UE cluster.

Aspect 17. The method of any of Aspects 15 to 16, further comprising: receiving an uplink phase synchronization signal from the first UE; and transmitting a downlink phase synchronization signal in response to the uplink phase synchronization signal, wherein the downlink phase synchronization signal provides phase synchronization for the uplink channel.

Aspect 18. The method of any of Aspects 15 to 17, further comprising: determining a phase drift parameter based on an uplink phase synchronization signal received from the first UE, wherein the phase drift parameter provides a phase synchronization for the uplink channel.

Aspect 19. The method of Aspect 18, further comprising: receiving channel state feedback (CSF) in response to a channel state information reference signal (CSI-RS), wherein the phase drift parameter is further based on the CSF.

Aspect 20. The method of any of Aspects 15 to 19, wherein the network entity corresponds to at least one of a central unit (CU), a distributed unit (DU), and a radio unit (RU).

Aspect 21. An apparatus for wireless communications, comprising: at least one memory; and at least one processor coupled to the at least one memory, wherein the at least one processor is configured to perform operations in accordance with any one of Aspects 15-20.

Aspect 22. An apparatus for wireless communications, comprising means for performing operations in accordance with any one of Aspects 15 to 20.

Aspect 23: A non-transitory computer-readable medium comprising instructions that, when executed by an apparatus, cause the apparatus to perform operations in accordance with any one of Aspects 15 to 20.

What is claimed is:

1. An apparatus for wireless communications, comprising:
at least one memory comprising instructions; and
at least one processor configured to execute the instructions and cause the apparatus to:
perform federated learning to generate a first set of updated model parameters corresponding to a machine learning model;
receive, from a network entity, a request for the first set of updated model parameters, wherein the request includes a resource allocation associated with an uplink channel;
determine, in response to signaling received from the network entity, a signal phase corresponding to the uplink channel;
transmit, to the network entity and in accordance with the signal phase, the first set of updated model parameters using the resource allocation on the uplink channel;
transmit a first sidelink reference signal to at least one user equipment (UE), wherein the first sidelink reference signal provides a phase synchronization among the apparatus and the at least one UE for the uplink channel;

receive, from the at least one UE, a second sidelink reference signal in response to the first sidelink reference signal;

determine a phase drift parameter based on the second sidelink reference signal; and adjust the signal phase based on the phase drift parameter.

2. The apparatus of claim 1, wherein the signaling includes channel state information (CSI) received from the network entity.

3. The apparatus of claim 1, wherein the signaling includes at least one reference signal received from the network entity on a downlink channel, and wherein the signal phase is based on phase data associated with the downlink channel.

4. The apparatus of claim 1, wherein the apparatus is configured to preserve the signal phase during a signal transmission following a signal reception.

5. The apparatus of claim 1, wherein the at least one processor is further configured to cause the apparatus to:
receive a second set of updated model parameters from a user equipment (UE); and
combine the second set of updated model parameters with the first set of updated model parameters to yield a combined set of updated model parameters, wherein the transmitting the first set of updated model parameters includes transmitting the combined set of updated model parameters.

6. The apparatus of claim 5, wherein the apparatus is a cluster head of a UE cluster that includes the apparatus and the UE.

7. The apparatus of claim 1, wherein the at least one processor is further configured to cause the apparatus to:
transmit an uplink phase synchronization signal to the network entity;
receive a downlink phase synchronization signal in response to the uplink phase synchronization signal;
determine a phase drift parameter based on the downlink phase synchronization signal; and
adjust the signal phase based on the phase drift parameter.

8. The apparatus of claim 1, wherein the at least one processor is further configured to cause the apparatus to:
transmit an uplink phase synchronization signal to the network entity; and
receive a phase drift parameter from the network entity, wherein the signal phase is based on the phase drift parameter.

9. The apparatus of claim 8, wherein the at least one processor is further configured to cause the apparatus to:
transmit channel state feedback (CSF) in response to a channel state information reference signal (CSI-RS) received from the network entity, wherein the phase drift parameter is based on the CSF.

10. A method for wireless communications performed at a first user equipment (UE), comprising:
performing federated learning to generate a first set of updated model parameters corresponding to a machine learning model;
receiving, from a network entity, a request for the first set of updated model parameters, wherein the request includes a resource allocation associated with an uplink channel;

determining, in response to signaling received from the network entity, a signal phase corresponding to the uplink channel;

transmitting, to the network entity and in accordance with the signal phase, the first set of updated model parameters using the resource allocation on the uplink channel;

transmitting a first sidelink reference signal to at least one other user equipment (UE), wherein the first sidelink reference signal provides a phase synchronization among the first UE and the at least one other UE for the uplink channel;

receiving, from the at least one other UE, a second sidelink reference signal in response to the first sidelink reference signal;

determining a phase drift parameter based on the second sidelink reference signal; and adjusting the signal phase based on the phase drift parameter.

11. The method of claim 10, wherein the signaling includes channel state information (CSI) received from the network entity.

12. The method of claim 10, wherein the signaling includes a reference signal received from the network entity on a downlink channel, and wherein the signal phase is based on phase data associated with the downlink channel.

13. The method of claim 10, wherein the first UE is configured to preserve the signal phase during a signal transmission following a signal reception.

14. The method of claim 10, further comprising:
receiving a second set of updated model parameters from a second UE; and
combining the second set of updated model parameters with the first set of updated model parameters to yield a combined set of updated model parameters, wherein the transmitting the first set of updated model parameters includes transmitting the combined set of updated model parameters.

15. The method of claim 14, wherein the first UE is a cluster head of a UE cluster that includes the first UE and the second UE.

16. The method of claim 10, further comprising:
transmitting an uplink phase synchronization signal to the network entity;
receiving a downlink phase synchronization signal in response to the uplink phase synchronization signal;
determining a phase drift parameter based on the downlink phase synchronization signal; and
adjusting the signal phase based on the phase drift parameter.

17. The method of claim 10, further comprising:
transmitting an uplink phase synchronization signal to the network entity; and
receiving a phase drift parameter from the network entity, wherein the signal phase is based on the phase drift parameter.

18. The method of claim 17, further comprising:
transmitting channel state feedback (CSF) in response to a channel state information reference signal (CSI-RS) received from the network entity, wherein the phase drift parameter is based on the CSF.

* * * * *